United States Patent
Moriya et al.

(10) Patent No.: US 10,741,207 B2
(45) Date of Patent: Aug. 11, 2020

(54) MAGNETIC RECORDING MEDIUM HAVING AN FEPTRH MAGNETIC LAYER

(71) Applicant: FUJI ELECTRIC CO., LTD., Kawasaki-shi (JP)

(72) Inventors: Tomohiro Moriya, Matsumoto (JP); Hitoshi Nakata, Matsumoto (JP); Takehito Shimatsu, Sendai (JP)

(73) Assignee: Fuji Electric Co., Ltd., Kawasaki-Shi, Kanagawa (JP)

( * ) Notice: Subject to any disclaimer, the term of this patent is extended or adjusted under 35 U.S.C. 154(b) by 236 days.

(21) Appl. No.: 15/664,228

(22) Filed: Jul. 31, 2017

(65) Prior Publication Data

US 2017/0352372 A1 Dec. 7, 2017

Related U.S. Application Data

(63) Continuation of application No. PCT/JP2016/003367, filed on Jul. 15, 2016.

(30) Foreign Application Priority Data

Aug. 24, 2015 (JP) ................................ 2015-165070

(51) Int. Cl.
*G11B 5/65* (2006.01)
*C22C 5/04* (2006.01)

(52) U.S. Cl.
CPC ............... *G11B 5/653* (2013.01); *C22C 5/04* (2013.01)

(58) Field of Classification Search
None
See application file for complete search history.

(56) References Cited

U.S. PATENT DOCUMENTS

| | | | | |
|---|---|---|---|---|
| 7,927,725 | B2* | 4/2011 | Ishio .................. | B82Y 10/00 428/836 |
| 9,601,144 | B1* | 3/2017 | Mehta ................ | G11B 5/66 |
| 9,601,145 | B1* | 3/2017 | Grobis ............... | G11B 5/66 |
| 9,940,962 | B2* | 4/2018 | Thiele ................ | G11B 5/653 |
| 10,115,424 | B2* | 10/2018 | Moriya ............... | G11B 5/65 |

(Continued)

FOREIGN PATENT DOCUMENTS

| | | |
|---|---|---|
| CN | 107112031 A | 8/2017 |
| CN | 107112032 A | 8/2017 |

(Continued)

OTHER PUBLICATIONS

Penoyer, R.F., "Automatic Torque Balance for Magnetic Anisotropy Measurements," The Review of Scientific Instruments, Aug. 1959, vol. 30, No. 8, pp. 711-714 [cited in spec].

(Continued)

*Primary Examiner* — Kevin M Bernatz
(74) *Attorney, Agent, or Firm* — Venable LLP; Henry J. Daley

(57) ABSTRACT

The present invention aims at providing a magnetic recording medium that can lower a Curie temperature (Tc) of a magnetic material, without increasing an in-plane coercive force and lowering magnetic properties. The magnetic recording medium is a magnetic recording medium comprising a substrate and a magnetic recording layer, the magnetic recording layer comprising an FePtRh ordered alloy, wherein a Rh content in the FePtRh ordered alloy is 10 at % or less.

5 Claims, 17 Drawing Sheets

(56) References Cited

U.S. PATENT DOCUMENTS

| | | | |
|---|---|---|---|
| 10,304,485 B2* | 5/2019 | Yoshizawa | G11B 5/65 |
| 2003/0108721 A1* | 6/2003 | Fullerton | G11B 5/66 |
| | | | 428/195.1 |
| 2009/0040644 A1 | 2/2009 | Lu et al. | |
| 2009/0161254 A1 | 6/2009 | Ishio et al. | |
| 2011/0104517 A1* | 5/2011 | Chen | G11B 5/64 |
| | | | 428/836.1 |
| 2013/0258523 A1* | 10/2013 | Maeda | G11B 5/667 |
| | | | 360/110 |
| 2014/0355156 A1* | 12/2014 | Hirotsune | G11B 5/7325 |
| | | | 360/234.3 |
| 2016/0267934 A1* | 9/2016 | Furuta | G11B 5/65 |
| 2017/0206918 A1* | 7/2017 | Nakata | G11B 5/653 |
| 2017/0301367 A1 | 10/2017 | Yoshizawa et al. | |
| 2017/0301368 A1* | 10/2017 | Kikuchi | G11B 5/66 |
| 2017/0365286 A1* | 12/2017 | Uchida | G11B 5/65 |

FOREIGN PATENT DOCUMENTS

| | | | | |
|---|---|---|---|---|
| JP | 2009-059461 A | 3/2009 | | |
| JP | 2009-151899 A | 7/2009 | | |
| JP | 2011-208167 A | 10/2011 | | |
| JP | 2015-005326 A | 1/2015 | | |
| WO | WO-2013187217 A1 * | 12/2013 | | G11B 5/653 |
| WO | 2017-002316 A1 | 1/2017 | | |

OTHER PUBLICATIONS

Chikazumi, Soshin, "Physics of Ferromagnetism vol. II", Shokabo Co., Ltd., pp. 10-21 [cited in spec].

Office Action in counterpart Chinese Patent Application No. 201680009030.6, dated Nov. 29, 2018.

Office Action from corresponding Singapore Application No. 11201706138V, dated Jul. 10, 2019.

* cited by examiner

MAGNETIC RECORDING MEDIUM HAVING AN FEPTRH MAGNETIC LAYER

CROSS-REFERENCE TO RELATED APPLICATIONS

This application is a continuation application of PCT Application No. PCT/JP2016/003367 filed on Jul. 15, 2016 under 37 Code of Federal Regulation § 1.53 (b) and the PCT application claims the benefit of Japanese Patent Application No. 2015-165070 filed on Aug. 24, 2015, all of the above applications being hereby incorporated by reference wherein in their entirety.

BACKGROUND OF THE INVENTION

Field of the Invention

The present invention relates to a magnetic recording medium, and specifically relates to a magnetic recording medium to be used in a hard disk magnetic recording device (HDD).

Description of the Related Art

In recent years, a request for higher density magnetic recording has been remarkable. A perpendicular magnetic recording system is adopted as a technology for realizing high densification of the magnetic recording. A perpendicular magnetic recording medium includes at least a non-magnetic substrate and a magnetic recording layer formed of a hard magnetic material. The perpendicular magnetic recording medium can further include, optionally, a soft magnetic backing layer that is formed of a soft magnetic material and plays a role of concentrating, on the magnetic recording layer, a magnetic flux generated by a magnetic head; an underlayer for orienting the hard magnetic material of the magnetic recording layer in an intended direction; a protective film that protects a surface of the magnetic recording layer; and the like.

In order to make the density of magnetic recording high, high thermal stability is necessary, and there is proposed a magnetic recording layer constituted of a material having high magnetic anisotropy such as FePt. However, FePt has high coercive force at room temperature, and an ordinary recording head cannot perform recording because of having an insufficient magnetic field. Accordingly, a heat-assisted magnetic recording system is proposed.

A heat-assisted magnetic recording system is a recording system in which a magnetic recording layer is irradiated with laser or the like and heated to thereby lower the coercive force, and in which, in the condition, a magnetic field for recording is applied to reverse magnetization. In a heat-assisted magnetic recording system, a magnetic material is heated to a vicinity of the Curie temperature and is recorded. It is known that the Curie temperature (Tc) of, for example, FePt is approximately 450° C.

On the other hand, recording at high temperatures brings about deterioration of a carbon protective film for protecting a magnetic recording layer or a lubricant on a protective film to thereby cause deterioration of the recording head itself, and thus becomes a factor of greatly lowering the reliability of a magnetic recording device. Accordingly, recording at a temperature as low as possible is desired.

There is a method of adding a third element (X) to FePt in order to lower Tc of FePt. For example, addition of an element such as Cu or Mn as X is proposed. For example, in Japanese Patent Laid-Open No. 2009-059461, addition of Cu or the like to FePt is proposed in order to lower Tc.

Japanese Patent Laid-Open No. 2009-151899 discloses a magnetic recording medium in which a magnetic recording layer deposited on a non-magnetic substrate comprises a plurality of ferromagnetic regions separated from each other by an antiferromagnetic region, in an in-plane direction. Japanese Patent Laid-Open No. 2009-151899 discloses that it is possible, by use of an alloy containing FePtRh as a main component in a ferromagnetic region and an antiferromagnetic region, to carry out high densification and magnetic separation between magnetic bits, and to suppress surface deterioration. However, Japanese Patent Laid-Open No. 2009-151899 makes no proposal relating to the lowering of recording temperature at the time of magnetic recording.

SUMMARY OF THE INVENTION

Technical Problem

In a case where Cu, Mn or the like is added to FePt as a third element (X) as in Japanese Patent Laid-Open No. 2009-059461, lowering of Tc can be realized to some extent. However, it became clear by the examination of the present inventors that a magnetization easy axis of a magnetic material in a magnetic recording layer was oriented in a plane of a substrate (in the present description, such orientation is also referred to as simply in-plane orientation) and an in-plane coercive force increases. A large in-plane coercive force means that unrecordable portions are increased in perpendicular magnetic recording, which is unfavorable. Namely, it is necessary to lower Tc without lowering perpendicular magnetic properties of a magnetic recording medium.

Therefore, the lowering of Tc of a magnetic material is desired without increase in an in-plane coercive force and without lowering of other magnetic properties.

Solution to Problem

A magnetic recording medium comprises a substrate and a magnetic recording layer, the magnetic recording layer comprising an ordered alloy having Fe, Pt and Rh, wherein a Rh content in the FePtRh ordered alloy is 10 at % or less.

In the magnetic recording medium, the ordered alloy having Fe, Pt and Rh has, preferably, a ratio of Fe/Pt of 1.0 or more, and a Rh content of 1 at % or more.

In the magnetic recording medium, the ordered alloy having Fe, Pt and Rh has, preferably, a ratio of Fe/Pt of 1.2 or more, and a Rh content of 1.5 at % or more. Furthermore, the magnetic recording medium has, more preferably, an Fe content of 50 at % or more.

The magnetic recording medium can lower Tc of a magnetic material without increasing an in-plane coercive force, and without lowering magnetic properties.

Further features of the present invention will become apparent from the following description of exemplary embodiments with reference to the attached drawings.

DESCRIPTION OF THE EMBODIMENTS

Figure 1:
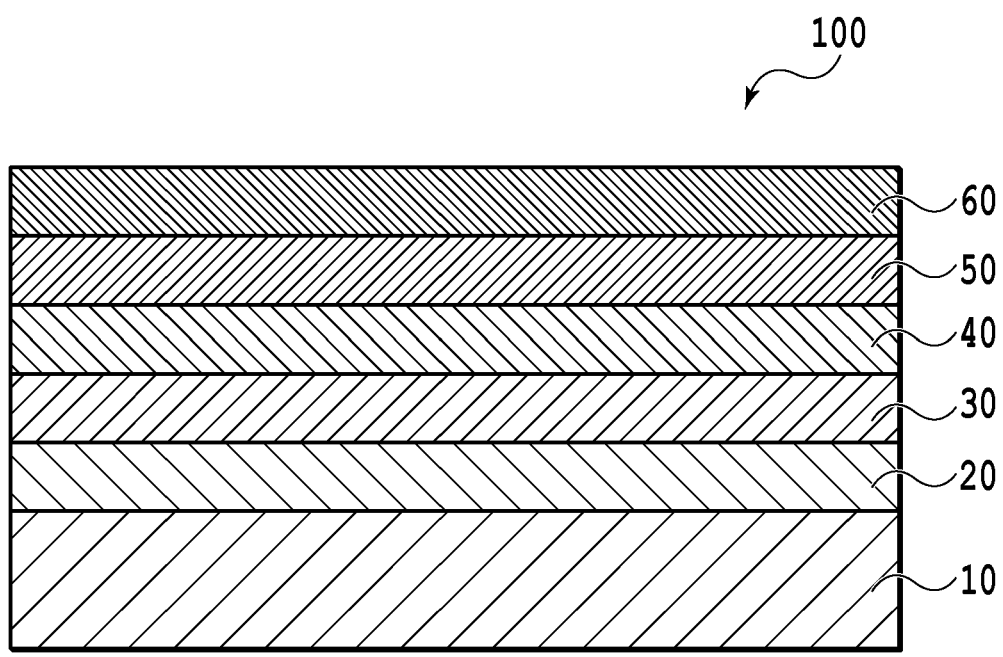
FIG. 1 is a cross-sectional view showing a configuration example of a magnetic recording medium.

A magnetic recording medium comprises a substrate; and a magnetic recording layer, the magnetic recording layer comprising an ordered alloy having Fe, Pt and Rh, wherein a Rh content in the ordered alloy having Fe, Pt and Rh is 10 at % or less. In the present description, the ordered alloy having Fe, Pt and Rh is also referred to as simply an FePtRh ordered alloy. In addition, in the present description, the notation of alloys or materials shown by elements such as FePtX and FePt simply means that the alloys or the materials has simply the elements as constituents, and does not specify the composition among the elements. Therefore, for example, the description of FePtRh only shows that constituent elements of the ordered alloy are Fe, Pt and Rh, and does not mean that the ratio of these constituent elements is 1:1:1. Furthermore, such terms as "consisting of FePtRh," and "consisting of FePt" herein mean that expressed elements are contained as constituents, and do not specify the ratio among elements being constituents. Accordingly, for example, "consisting of FePtRh" means that the material is constituted only of elements of Fe, Pt and Rh, and does not mean that the ratio of these elements is 1:1:1. The magnetic recording medium may further comprise a layer or layers known in the art such as an adhesion layer, a soft magnetic backing layer, a heat-sink layer, an underlayer and/or a seed layer, between the substrate and the magnetic recording layer. In addition, the magnetic recording medium may further comprise a layer or layers known in the art such as a protective layer and/or a liquid-lubricant layer, on the magnetic recording layer. An example of a magnetic recording medium can include a configuration in which a substrate; a magnetic recording layer comprising a first magnetic layer and an upper layer; and a protective layer are included. Moreover, in FIG. 1, there is shown a configuration example of a magnetic recording medium comprising a substrate 10, an adhesion layer 20, an underlayer 30, a seed layer 40, a magnetic recording layer 50 and a protective layer 60.

The substrate 10 may be various substrates each having a smooth surface. For example, the substrate 10 can be formed by use of a material generally used for a magnetic recording medium. Examples of usable materials include a NiP-plated Al alloy, a MgO single crystal, $MgAl_2O_4$, $SrTiO_3$, reinforced glass, crystallized glass, and the like.

The adhesion layer 20 that may be optionally provided is used for enhancing adhesiveness between a layer formed on the adhesion layer 20 and a layer formed under the adhesion layer 20. Layers to be formed under the adhesion layer 20 include the substrate 10. Materials for forming the adhesion layer 20 include metals such as Ni, W, Ta, Cr and Ru, and alloys containing the aforementioned materials. The adhesion layer 20 may be a single layer, or may have a laminated structure of a plurality of layers.

A soft magnetic backing layer (not shown), which may be optionally provided, controls a magnetic flux from a magnetic head to improve recording and reproduction characteristics of a magnetic recording medium. Materials for forming the soft magnetic backing layer include (i) crystalline materials such as a NiFe alloy, a Sendust (FeSiAl) alloy and a CoFe alloy, (ii) microcrystalline materials such as FeTaC, CoFeNi and CoNiP, or (iii) amorphous materials containing a Co alloy such as CoZrNb and CoTaZr. The optimal value of thickness of a soft magnetic backing layer depends on a structure and characteristics of a magnetic head for use in magnetic recording. When a soft magnetic backing layer is formed by continuous deposition with another layer, in view of balance with productivity, a soft magnetic backing layer preferably has a thickness within a range of 10 nm to 500 nm (both inclusive).

When the magnetic recording medium of the present invention is used in a heat-assisted magnetic recording system, a heat-sink layer (not shown) may be provided. The heat-sink layer is a layer for effectively absorbing excess heat of the magnetic recording layer 50 generated at the time of the heat-assisted magnetic recording. The heat-sink layer can be formed by use of a material with high heat conductivity and specific heat capacity. Such materials include a Cu simple substance, an Ag simple substance, an Au simple substance or an alloy material mainly composed of them. Here, the phrase "mainly composed of" means that a content of the material concerned is 50 wt % or more. Furthermore, from the viewpoint of strength or the like, the heat-sink layer can be formed by use of an Al—Si alloy, a Cu—B alloy, or the like. Moreover, the heat-sink layer can be formed by use of a Sendust (FeSiAl) alloy, a soft magnetic CoFe alloy, or the like. It is also possible to impart, to the heat-sink layer, a function of concentrating a magnetic field in a perpendicular direction generated by the head on the magnetic recording layer 50 to thereby make it possible to complement the function of the soft magnetic backing layer, by use of the soft magnetic material. An optimal value of the thickness of the heat-sink layer changes depending on a heat quantity and heat distribution at the time of the heat-assisted magnetic recording, and depending on configurations and thicknesses of the respective layers of the magnetic recording medium. In a case where a heat-sink layer is formed by continuous deposition with another layer, the thickness of the heat-sink layer is preferably 10 nm or more and 100 nm or less in view of a balance with productivity. The heat-sink layer can be formed by use of any method known in the technology concerned such as a sputtering method or a vacuum vapor deposition method. In ordinary cases, the heat-sink layer is formed by use of a sputtering method. The heat-sink layer can be provided between the substrate 10 and the adhesion layer 20, between the adhesion layer 20 and the underlayer 30, or the like, in consideration of the properties required for the magnetic recording medium.

The underlayer 30 is a layer for controlling crystallinity and/or crystalline orientation of the seed layer 40 formed on the upper side thereof. The underlayer 30 may be a single layer or multiple layers. The underlayer 30 is preferably non-magnetic. A non-magnetic material used for forming the underlayer 30 includes (i) a single metal such as a Pt metal or a Cr metal, or (ii) an alloy obtained by adding at least one kind of metal selected from the group consisting of Mo, W, Ti, V, Mn, Ta and Zr to Cr being a main component. The underlayer 30 can be formed by use of any process known in the art, such as a sputtering method.

The function of the seed layer 40 is to control a grain diameter of magnetic crystal grains and crystalline orientation in the magnetic recording layer 50 as the upper layer. The seed layer 40 may be given a function of securing adhesiveness between a layer under the seed layer 40 and the magnetic recording layer 50. Furthermore, another layer such as an intermediate layer may be disposed between the seed layer 40 and the magnetic recording layer 50. When an intermediate layer or the like is to be disposed, the particle size and crystalline orientation of magnetic crystal grains in the magnetic recording layer 50 is controlled by the control of the grain diameter and crystalline orientation of crystal grains in an intermediate layer or the like. The seed layer 40 is preferably non-magnetic. The material of the seed layer 40 may be appropriately selected in accordance with the material of the magnetic recording layer 50. More specifically, the material of the seed layer 40 is selected in accordance with the material of magnetic crystal grains in a magnetic recording layer. For example, in a case where the magnetic crystal grain in the magnetic recording layer 50 is formed from an $L1_0$-type ordered alloy, the seed layer 40 is preferably formed by use of a NaCl-type compound. Particularly preferably, the seed layer 40 can be formed by use of an oxide such as MgO or $SrTiO_3$, or a nitride such as TiN. Moreover, the seed layer 40 can also be formed by laminating a plurality of layers containing the aforementioned material. From the viewpoint of improving crystallinity of magnetic crystal grains in the magnetic recording layer 50 and improving productivity, the seed layer 40 has thickness of 1 nm to 60 nm, preferably 1 nm to 20 nm. The seed layer 40 can be formed by use of any process known in the art, such as a sputtering method.

The magnetic recording medium includes the magnetic recording layer 50. The magnetic recording layer 50 is an FePtRh ordered alloy comprising iron (Fe), platinum (Pt) and rhodium (Rh).

In the FePtRh ordered alloy constituting the magnetic recording layer 50, the ratio of Fe to Pt is preferably Fe/Pt≥1, more preferably Fe/Pt≥1.2. In addition, in the FePtRh ordered alloy, the content of Rh is preferably 10 at % or less. Furthermore, in a case of Fe/Pt≥1, the FePtRh ordered alloy preferably has a composition in which a Rh amount of the FePtRh ordered alloy is 1 at % or more. Moreover, in a case of Fe/Pt≥1.2, the Rh amount of the FePtRh ordered alloy is preferably 1.5 at % or more. In the magnetic recording medium, in a case of Fe/Pt≥1.2 in the FePtRh ordered alloy and in a case where the Rh amount of the FePtRh ordered alloy is 1.5 at % or more, an Fe content is more preferably Fe≥50 at %.

Figure 2:
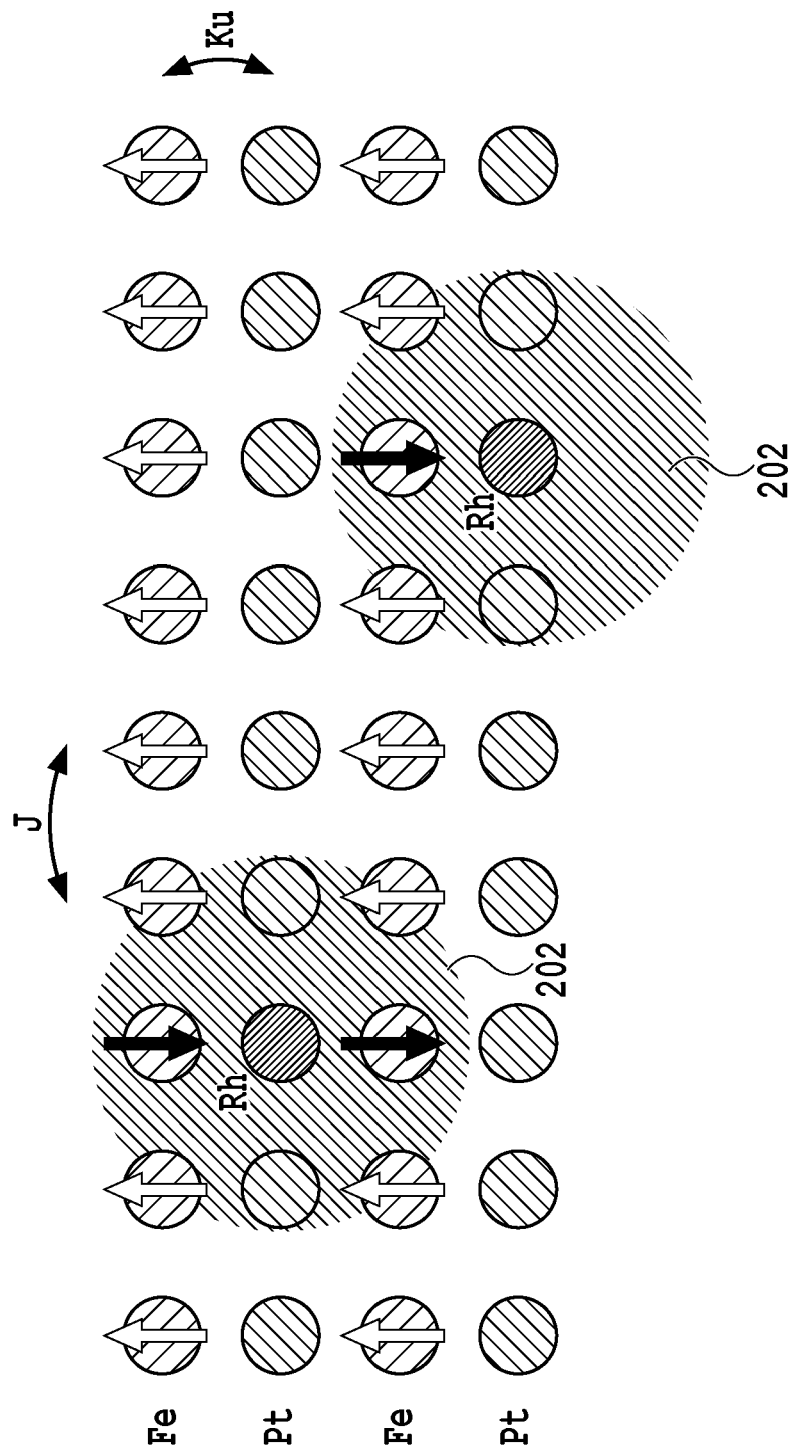
FIG. 2 is a schematic view for describing a state in a case where Rh is added to FePt in a magnetic recording layer of a magnetic recording medium.

Without intended to be restricted by any theory, there will be described, with reference to FIG. 2, a state of a magnetic recording layer in a case of containing Rh in a magnetic recording layer.

It is well known that, by insertion of a thin coupling layer constituted of a non-magnetic transition metal such as Rh, Cu or Cr between ferromagnetic layers in a magnetic recording layer of a magnetic recording medium, adjacent magnetic layers form antiferromagnetic exchange coupling. An antiferromagnetic coupling energy changes depending on kinds of elements, structures of layers to be sandwiched, or the like. When the maximum values of antiferromagnetic exchange coupling energies are compared with respect to coupling layers using the above-described elements, the antiferromagnetic exchange coupling energy in a case where Rh is used as a coupling layer is particularly large. Furthermore, it is known that Rh can exert the above-described effect from a thin thickness. In addition, according to experiments of the present inventors, it was ascertained that, when Ku of layers are equal to each other, the addition of Rh to an ordered alloy such as FePt provided a small saturation magnetization Ms of the layer as compared with the addition of another element such as Cu. When these points are comprehensively considered, it is presumed that a phenomenon similar to an antiferromagnetic coupling, in which a couple having an inverse direction is generated via the added Rh, occurs in the layer. In the present invention, the FePtRh ordered alloy is a ferromagnetic material in the magnetic recording layer, but it is considered that a region having antiferromagnetic properties is brought about locally around Rh as shown by, for example, 202 in FIG. 2, and that Fe atoms with a Rh atom therebetween form a couple so as to have spins of opposite directions. As the result, it is considered that magnetic properties are modified. This is considered to be a feature different from that of a state of FePt as an ordered alloy to which no Rh is added or the like. In a case where an antiferromagnetic domain is formed by the addition of Rh, a bonding interaction (J) between Fe—Fe becomes weak and Tc lowers, but it is considered that influence on a magnetic anisotropy constant (Ku) generated between Fe—Pt is small. As described above, an antiferromagnetic coupling via the added Rh is generated in apart of the inside of the ordered alloy, and thus disturbance of whole spin is easily generated at a relatively low temperature when temperature is raised, to thereby lower Tc while high Ku near room temperature is kept. Accordingly, it is considered that there is obtained a steep temperature property that a gradient of magnetic properties relative to temperature becomes large.

In the present invention, the temperature of Tc can be made lower without deterioration of magnetic properties, by adoption of FePtRh as the material of the magnetic recording layer 50. Furthermore, in the present invention, Tc of a magnetic material can be lowered without increase in an in-plane coercive force and without lowering of magnetic properties, by use of FePtRh having the composition ratio within the above-described range.

The magnetic recording layer 50 is preferably formed by a sputtering method with heating of a substrate. Examples of sputtering methods can include general methods well known in the art, such as a DC magnetron sputtering method and an RF sputtering method, and these general methods can be used in the present invention. The term "sputtering method" used herein has the same meaning as that of the above-described general methods, unless noted otherwise.

"sputtering" herein means only a step of causing atoms, clusters or ions to be ejected from a target by collision of ions with high energy, and does not mean that all elements included in the ejected atoms, clusters or ions are fixed onto a substrate to be deposited. In other words, a thin film obtained in a process of "sputtering" herein does not necessarily includes elements arriving at a substrate to be deposited, at a ratio of the amount as arrived.

A target, for example, comprising Fe, Pt and Rh at a predetermined ratio may be used as a target for use in a sputtering method. Alternatively, a target including Fe and Pt, and a Rh target may be used. Yet alternatively, each target of Fe, Pt and Rh may be used. In either case, a composition ratio can be controlled by adjustment of an electric power applied to each target.

In a case where the magnetic recording layer 50 is formed, the substrate is heated. The substrate temperature in the heating is within the range of 300° C. to 700° C. The degree of order in the ordered alloy in the magnetic recording layer 50 can be improved by adoption of the substrate temperature within the range.

In addition, the magnetic recording layer 50 has a thickness of 1 to 30 nm.

A layer playing a role in magnetic recording of a magnetic recording medium may be a single layer of the magnetic recording layer 50, or may be a laminated body of a plurality of layers obtained by adding another layer to the magnetic recording layer 50. Each of the plurality of additional layers may have either a granular structure or a non-granular structure. For example, an ECC (Exchange-coupled Composite) structure may be formed by laminating the magnetic recording layer 50, the additional magnetic layer and a coupling layer such as Ru so that the coupling layer is sandwiched between the magnetic recording layer 50 and the added magnetic layer. Alternatively, a magnetic layer without a granular structure may be provided on the upper part of the magnetic recording layer 50 as a continuous layer. The continuous layer includes a so-called CAP layer.

When a laminated body of a plurality of layers obtained by adding another layer to the magnetic recording layer 50 is adopted, description regarding the arrangement, for example, on or under the magnetic recording layer 50 should be understood as the arrangement, for example, on or under the laminated body.

The magnetic recording layer 50 may have a granular structure containing a magnetic crystal grain and a non-magnetic crystal grain boundary surrounding the magnetic crystal grain. The magnetic crystal grain can comprise the above-described ordered alloy. The non-magnetic crystal grain boundary can comprise at least one material selected from the group consisting of oxides such as $SiO_2$, $TiO_2$ and ZnO; nitrides such as SiN and TiN; carbon (C); and boron (B). For example, the non-magnetic crystal grain boundary may comprise a mixture of carbon (C) and boron (B).

When the magnetic recording layer 50 having a granular structure is formed, a target obtained by mixing, at a predetermined ratio, a material for forming a magnetic crystal grain and a material for forming a non-magnetic crystal grain boundary may be used. Alternatively, a target consisting of a material for forming a magnetic crystal grain and a target consisting of a material for forming a non-magnetic crystal grain boundary may be used. As described above, a plurality of targets may be used as a target for forming a magnetic crystal grain. In this case, an electric power can be applied independently to each target to control the ratio of a magnetic crystal grain and a non-magnetic crystal grain boundary in a magnetic recording layer.

The protective layer 60 can be formed by use of a material commonly used in the field of a magnetic recording medium. Specifically, the protective layer 60 can be formed by use of a non-magnetic metal such as Pt, a carbon-based material such as diamond-like carbon, or a silicon-based material such as silicon nitride. Furthermore, the protective layer 60 may be a single layer, or may have a laminated structure. The protective layer 60 of a laminated structure may be, for example, a laminated structure of two types of carbon-based materials having different properties, a laminated structure of a metal and a carbon-based material, or a laminated structure of a metal oxide film and a carbon-based material. The protective layer 60 can be formed by use of any process known in the art, such as a CVD method, a sputtering method (including a DC magnetron sputtering method etc.) or a vacuum vapor deposition method.

Optionally, the magnetic recording medium of the present invention may further comprise a liquid-lubricant layer (not shown) provided on the protective layer 60. The liquid-lubricant layer can be formed by use of a material commonly used in the field of magnetic recording medium. Examples of materials of the liquid-lubricant layer include perfluoropolyether-based lubricants, and the like. The liquid-lubricant layer can be formed by use of, for example, a coating method such as a dip coating method or a spin coating method.

EXAMPLES

Hereinafter, the present invention will be described based on Examples, but following Examples are not intended to restrict the present invention.

In following Examples, properties of a magnetic recording medium such as Tc, saturation magnetization (Ms), in-plane coercive force (Hc_in) and magnetic anisotropy constant (Ku), and a composition of a magnetic recording layer were measured by respective methods below.

The composition of the magnetic recording layer was measured by a Rutherford backscattering (RBS) method (X=Rh, Cu and Ru), and a high frequency inductively coupled plasma atomic emission spectrometric analysis method (ICP-AES) (X=Mn).

Saturation magnetization (Ms) of the obtained magnetic recording medium was obtained by use of a vibrating sample magnetometer (VSM). Furthermore, saturation magnetization Ms (T) was measured by use of VSM at room temperature and at a plurality of measurement temperatures T, and square of the saturation magnetization $Ms^2$ (T) was plotted with respect to measurement temperatures (T) and a regression line was obtained by a least-squares method. The obtained regression line was extrapolated up to a point of $Ms^2=0$ to give the Curie temperature Tc.

Dependency of spontaneous magnetization on a magnetic field application angle was evaluated by use of a PPMS (Physical Property Measurement System, manufactured by Quantum Design) apparatus, and magnetic anisotropy constants Ku at intended temperatures were determined. In the determination of the magnetic anisotropy constant Ku, there were used techniques described in R. F. Penoyer, "Automatic Torque Balance for Magnetic Anisotropy Measurements," The Review of Scientific Instruments, 711-714, Vol. 30, No. 8, August 1959, or in Chikazumi Soshin, "Physics of Ferromagnetism" (vol. 2) 10-21, Shokabo Co., Ltd.

Furthermore, an in-plane coercive force (Hc_in) was measured by a vibrating sample magnetometer (VSM).

Example 1

In the Example, there was examined the relationship between an addition amount of X and in-plane orientation, of a magnetic recording medium comprising a magnetic recording layer consisting of FePtX (X=Rh or Cu).

Respective layers of a magnetic recording medium were deposited respectively according to a procedure below, and magnetic properties were evaluated.

A magnesium oxide (MgO) substrate was prepared. The substrate was introduced into a sputtering apparatus of an inline system. A Pt layer having a thickness of 20 nm was formed by an RF sputtering method using a pure Pt target in Ar gas having a pressure of 0.44 Pa. Substrate temperature at the time of forming the Pt layer was 350° C. Furthermore, a sputtering electric power at the time of forming the Pt layer was 300 W.

Next, there was formed, on the substrate having the Pt layer formed thereon, an FePtX layer consisting of FePtX by an RF sputtering method using an FePt target and an addition element (X: X=Rh or Cu) in Ar gas having a pressure of 0.60 Pa, at 350° C. Thickness of the FePtX layer was 10 nm. Electric powers applied to targets at the time of forming the FePtX layer were 300 W (FePt) and 0 to 240 W (X). The content of X in the layer consisting of FePtX was adjusted to an intended value by changing the electric power to be applied to X. Contents of respective elements are shown in Table 1. Furthermore, measurement results of the in-plane coercive force (Hc_in) are shown together in Table 1.

TABLE 1

| FePtX composition | | | | | |
|---|---|---|---|---|---|
| Fe content (at %) | Pt content (at %) | X = Rh addition amount (at %) | X = Cu addition amount (at %) | Fe/Pt | Properties Hc_in (kOe) |
| 54.8 | 45.2 | 0.0 | — | 1.2 | 0.11 |
| 53.5 | 45.0 | 1.5 | — | 1.2 | 0.13 |
| 52.4 | 43.6 | 4.1 | — | 1.2 | 0.12 |
| 50.6 | 41.6 | 7.8 | — | 1.2 | 0.11 |
| 49.4 | 41.0 | 9.6 | — | 1.2 | 0.10 |
| 51.7 | 48.3 | 0.0 | — | 1.1 | 0.1 |
| 49.9 | 48.4 | 1.7 | — | 1.0 | 0.09 |
| 48.1 | 47.6 | 4.3 | — | 1.0 | 0.10 |
| 45.1 | 44.9 | 10.0 | — | 1.0 | 0.10 |
| 54.2 | 45.8 | — | 0.0 | 1.2 | 0.12 |
| 53.0 | 46.3 | — | 0.7 | 1.1 | 0.21 |
| 52.6 | 45.6 | — | 1.8 | 1.2 | 0.25 |
| 49.1 | 41.4 | — | 9.5 | 1.2 | 0.57 |
| 47.0 | 53.0 | — | 0.0 | 0.9 | 0.1 |
| 45.6 | 53.1 | — | 1.3 | 0.9 | 0.12 |
| 45.3 | 50.3 | — | 4.4 | 0.9 | 0.16 |
| 42.5 | 46.3 | — | 11.2 | 0.9 | 0.26 |

Figure 3:
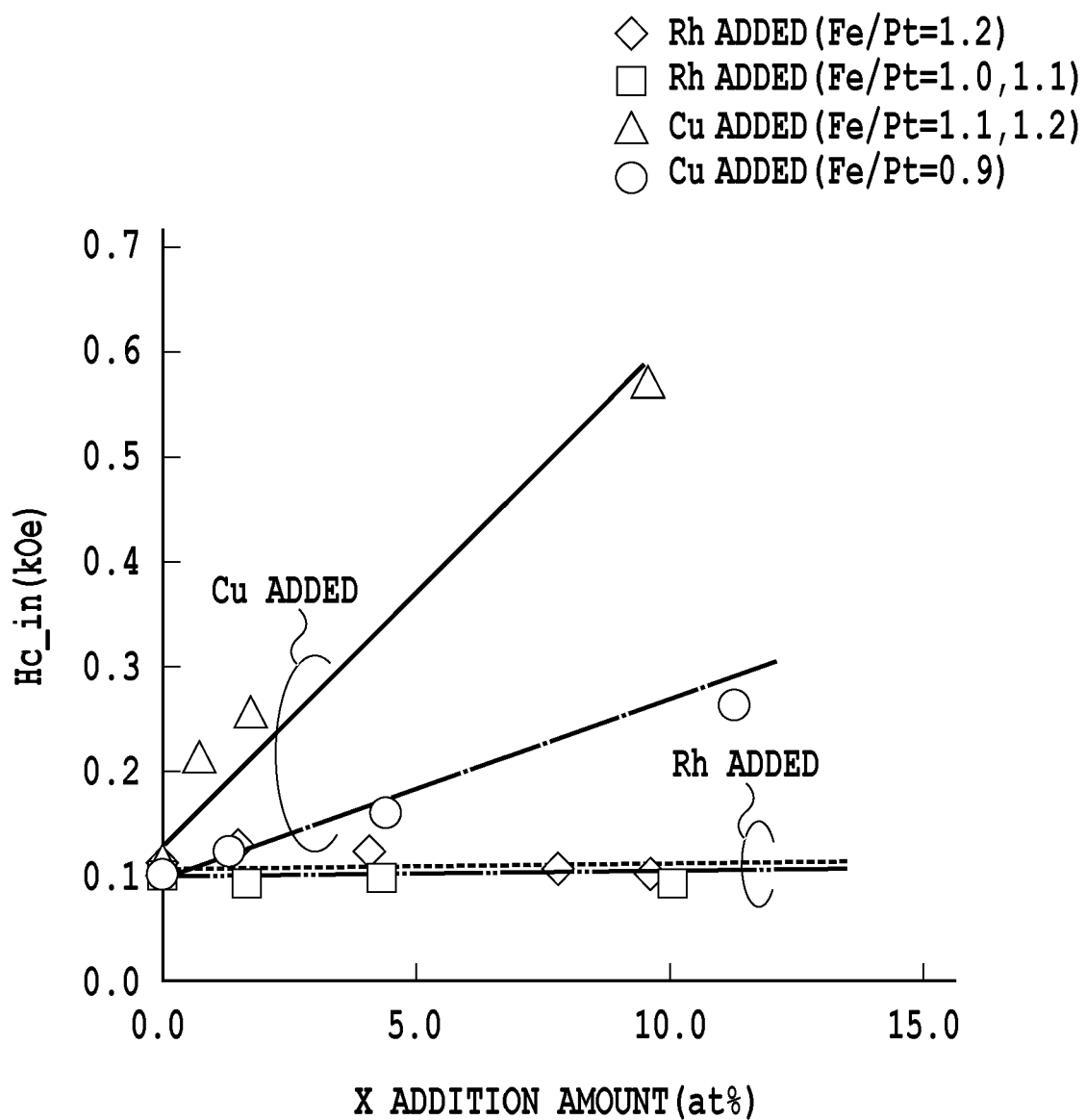
FIG. 3 is a graph showing a relationship between an addition amount (at %) of X and an in-plane coercive force (Hc_in) (kOe) in a case where FePtX (X=Rh or Cu) is used for a magnetic recording layer of a magnetic recording medium.

Results shown in Table 1 are shown in the graph in FIG. 3. As shown in Table 1 and FIG. 3, as long as Fe/Pt ratios are shown in Table 1, a tendency to increase the in-plane coercive force (Hc_in) was not observed even in a case where the addition amount of Rh increased. On the other hand, in a case of Cu, a tendency to increase the in-plane coercive force was shown as the addition amount of Cu increased.

As to Rh, as described above, it is considered that the in-plane coercive force (Hc_in) may be unlikely to increase even when the addition amount of Rh increases, but furthermore, there was examined in detail a state of in-plane orientation when Rh was added.

Table 2 shows the addition amount of Rh, and a ratio of peak integrated intensities between (002) representing a perpendicular orientation component of FePt and (200) representing an in-plane orientation component, evaluated by use of XRD. In the present description, the ratio is also referred to as a "peak intensity ratio of an in-plane orientation component." The value of the peak intensity ratio of an in-plane orientation component is a value serving as an index indicating how many in-plane orientation components exist, and means that the larger the value is, the larger the number of in-plane orientations is. Since the index is obtained by utilization of structural analysis by X-rays, a state of in-plane orientation can be comprehended in more detail. Furthermore, in Table 2, the peak intensity ratio of an in-plane orientation component in a case of the addition amount of Rh being 0 is denoted as 100%, and there is shown together a percentage (%) of variation of the peak intensity ratio of an in-plane orientation component when Rh is added. This variation is also referred to as a variant amount in the present description.

TABLE 2

| FePtRh composition | | | | Properties | |
|---|---|---|---|---|---|
| Fe content (at %) | Pt content (at %) | Rh addition amount (at %) | Fe/Pt | I(200)/ [I(002) + I(200)] | Variant amount (%) |
| 57.1 | 42.9 | 0.0 | 1.3 | 27 | 100 |
| 56.1 | 42.0 | 1.9 | 1.3 | 22 | 81 |
| 54.4 | 40.3 | 5.3 | 1.4 | 24 | 89 |

TABLE 2-continued

| FePtRh composition | | | | Properties | |
|---|---|---|---|---|---|
| Fe content (at %) | Pt content (at %) | Rh addition amount (at %) | Fe/Pt | I(200)/ [I(002) + I(200)] | Variant amount (%) |
| 52.1 | 38.3 | 9.6 | 1.4 | 24 | 89 |
| 50.5 | 37.3 | 12.2 | 1.4 | 30 | 111 |
| 49.1 | 36.2 | 14.6 | 1.4 | 29 | 107 |
| 54.8 | 45.2 | 0.0 | 1.2 | 21 | 100 |
| 53.5 | 45.0 | 1.5 | 1.2 | 17 | 81 |
| 52.4 | 43.6 | 4.1 | 1.2 | 18 | 86 |
| 50.6 | 41.6 | 7.8 | 1.2 | 18 | 86 |
| 49.4 | 41.0 | 9.6 | 1.2 | 21 | 100 |
| 45.7 | 37.9 | 16.4 | 1.2 | 22 | 105 |
| 51.7 | 48.3 | 0.0 | 1.1 | 23 | 100 |
| 49.9 | 48.4 | 1.7 | 1.0 | 21 | 91 |
| 48.1 | 47.6 | 4.3 | 1.0 | 21 | 91 |
| 45.1 | 44.9 | 10.0 | 1.0 | 22 | 90 |

Figure 4:
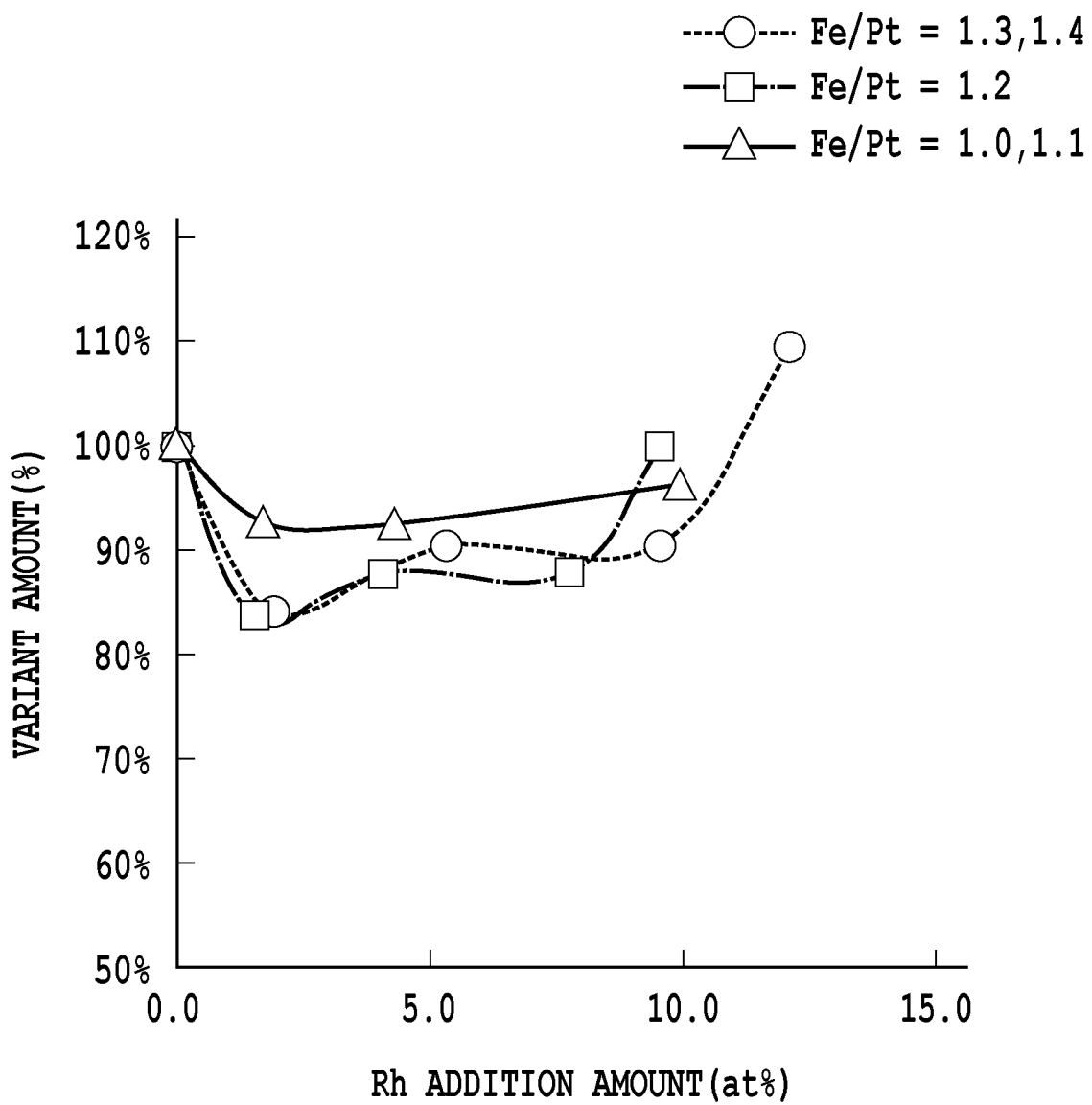
FIG. 4 is a graph showing a relationship between an addition amount (at %) of Rh and a variant amount (%) in a case where FePtRh is used for a magnetic recording layer of a magnetic recording medium.
Figure 5:
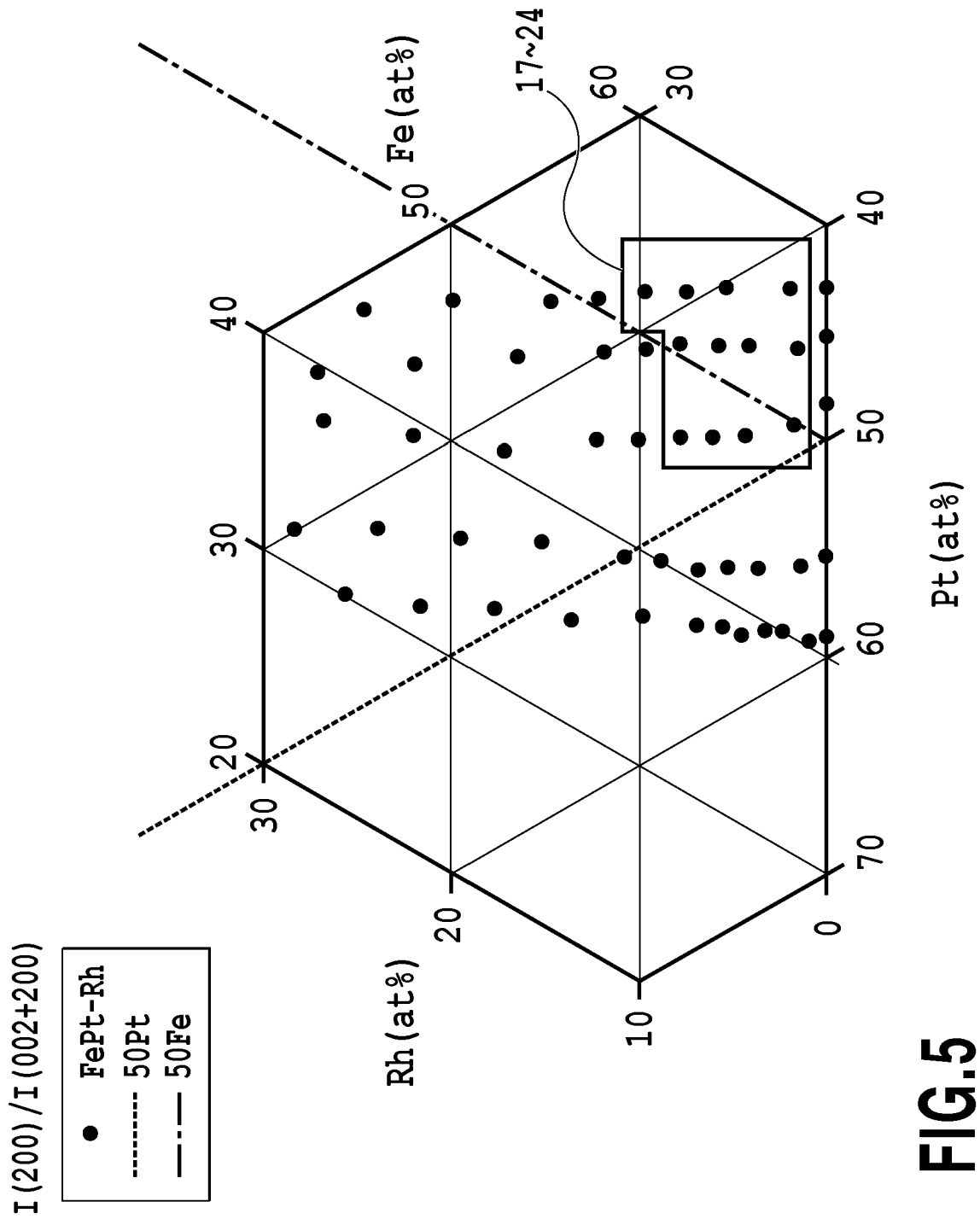
FIG. 5 is a ternary phase diagram in which there is plotted with respect to contents (at %) of Fe, Pt and Rh, a peak intensity ratio of an in-plane orientation component in a case where FePtRh is used for a magnetic recording layer of a magnetic recording medium.

In FIG. 4, the variant quantities (%) in Table 2 are shown in a graph. In addition, FIG. 5 is a ternary phase diagram in which the peak intensity ratio of in-plane orientation component is plotted with respect to contents (at %) of Fe, Pt and Rh.

As shown in FIG. 4, it is known that in a case where the addition amount of Rh is increased, the variant amount is lowered as compared with a case where no Rh is added. Furthermore, in a case where the addition amount of Rh exceeds 10%, there is such a tendency that the variant amount exceeds 100% in a range in which a ratio of Fe/Pt is 1.2 or more. The above-described preferable composition and the peak intensity ratio of an in-plane orientation component are shown as a range surrounded by a solid line in the ternary phase diagram in FIG. 5.

From the result of the Example, it is considered that the addition amount of Rh in FePtRh as a material of a magnetic recording layer is preferably 10 at % or less. Furthermore, it is considered that the addition amount of Rh in FePtRh as a material of a magnetic recording layer is preferably 1 at % or more. Therefore, the addition amount of Rh in FePtRh is preferably 10 at % or less, more preferably 1 at % or more and less than 10 at %, and further more preferably 1 at % or more and 8 at % or less, from the tendency of the addition amount of Rh in Table 2.

Next, the relationship between the ratio of Fe/Pt and the addition amount of Rh will be considered. First, in a region of Fe/Pt≥1.0, there is such a tendency that the variant amount decreases in a composition range where Rh is about 1 at % or more, in a case where the addition amount of Rh is 10 at % or less. Accordingly, in the region of Fe/Pt≥1.0, the addition amount of Rh is preferably 1 at % or more and 10 at % or less, and particularly preferably 1 at % or more and 5 at % or less.

In a region of Fe/Pt≥1.2, there is such a tendency that the in-plane orientation decreases in the addition amount of Rh being 1.5 at % or more, in a case where the addition amount of Rh is 10 at % or less. Therefore, in the region of Fe/Pt≥1.2, the addition amount of Rh is preferably 10 at % or less, more preferably 1.5 at % or more and 10 at % or less, and further preferably 1.5 at % or more and 8 at % or less. In addition, in a region of Fe/Pt≥1.3-1.4, the addition amount of Rh is preferably 10 at % or less, more preferably 1.5 at % or more and 10 at % or less, and further preferably 1.5 at % or more and less than 10 at %. Moreover, in these cases, in particular, there is such a tendency that the in-plane orientation decreases more, in a composition range in which an Fe content in FePtRh is 50 at % or more.

The result in the Example shows that, in a region in which the Fe content in FePtRh is larger than the Pt content, there is such a tendency that a reduction effect of the variant amount caused by Rh addition is large. Without intended to be restricted by any theory, the reason can be considered as follows. When mixing enthalpies of Rh+Fe and Rh+Pt are compared, that of Rh+Fe gives a smaller value, and thus it is considered that Pt is easily substituted by Rh, as compared with Fe in an FePt alloy. It is considered that this causes the above-described result.

Example 2

In the Example, Tc, Ms and Ku of FePtRh were evaluated.
Respective layers of a magnetic recording medium were deposited respectively according to a procedure below, and magnetic properties were evaluated.

A magnesium oxide (MgO) substrate was prepared. The substrate was introduced into a sputtering apparatus of an inline system. A Pt layer having a thickness of 20 nm was formed by an RF sputtering method using a pure Pt target in Ar gas having a pressure of 0.44 Pa. Substrate temperature at the time of forming the Pt layer was 350° C. A sputtering electric power at the time of forming the Pt layer was 300 W.

Next, on the substrate having the Pt layer formed thereon, an FePtRh layer consisting of FePtRh was formed by an RF sputtering method using an FePt target and a Rh target in Ar gas having a pressure of 0.60 Pa, at 350° C. Thickness of the FePtRh layer was 10 nm. Electric powers applied to targets at the time of forming the FePtRh layer were 300 W (FePt) and 0 to 240 W (Rh). The content of Rh in the layer consisting of FePtRh was adjusted to an intended value by changing the electric power to be applied to Rh. Contents of respective elements, compositions, and the like are shown in Table 3.

Furthermore, according to above-described respective techniques, Tc and magnetic properties (Ms and Ku) were evaluated. Results are shown together in Table 3.

TABLE 3

| FePtRh composition | | | | Properties | | |
|---|---|---|---|---|---|---|
| Fe content (at %) | Pt content (at %) | Rh addition amount (at %) | Fe/Pt | Ms (emu/cm³) | Ku [PPMS-TRQ] (erg/cm³) | Tc (° C.) |
| 56.4 | 43.6 | 0.0 | 1.3 | 1157 | 2.96E+07 | 404 |
| 54.4 | 40.3 | 5.3 | 1.4 | 1068 | 2.65E+07 | 327 |
| 53.2 | 39.4 | 7.4 | 1.4 | 986 | 2.49E+07 | 273 |
| 52.1 | 38.3 | 9.6 | 1.4 | 911 | 2.17E+07 | 249 |
| 50.5 | 37.3 | 12.2 | 1.4 | 753 | 1.76E+07 | 217 |
| 49.1 | 36.2 | 14.6 | 1.4 | 555 | 1.17E+07 | 186 |
| 54.2 | 45.8 | 0.0 | 1.2 | 1068 | 3.12E+07 | 418 |
| 52.4 | 43.6 | 4.1 | 1.2 | 1021 | 3.37E+07 | 351 |
| 50.6 | 41.6 | 7.8 | 1.2 | 904 | 2.73E+07 | 309 |
| 48.2 | 40.0 | 11.8 | 1.2 | 708 | 2.03E+07 | 245 |
| 45.7 | 37.9 | 16.4 | 1.2 | 498 | 1.12E+07 | 200 |
| 48.9 | 51.1 | 0.0 | 1.0 | 1004 | 2.76E+07 | 399 |
| 48.1 | 47.6 | 4.3 | 1.0 | 1023 | 3.26E+07 | 357 |
| 46.3 | 45.9 | 7.8 | 1.0 | 855 | 2.28E+07 | 301 |
| 44.0 | 43.8 | 12.2 | 1.0 | 699 | 1.79E+07 | 246 |
| 41.0 | 41.9 | 17.1 | 1.0 | 515 | 1.10E+07 | 178 |
| 45.9 | 54.1 | 0.0 | 0.85 | 875 | 2.07E+07 | 371 |
| 42.3 | 54.1 | 3.7 | 0.78 | 844 | 1.79E+07 | 294 |
| 40.7 | 52.5 | 6.8 | 0.78 | 741 | 1.61E+07 | 267 |
| 40.1 | 51.1 | 8.8 | 0.78 | 685 | 1.37E+07 | 244 |
| 39.3 | 49.9 | 10.8 | 0.79 | 625 | 1.23E+07 | 216 |
| 37.8 | 47.1 | 15.1 | 0.80 | 494 | 9.26E+06 | 134 |

Figure 6A:
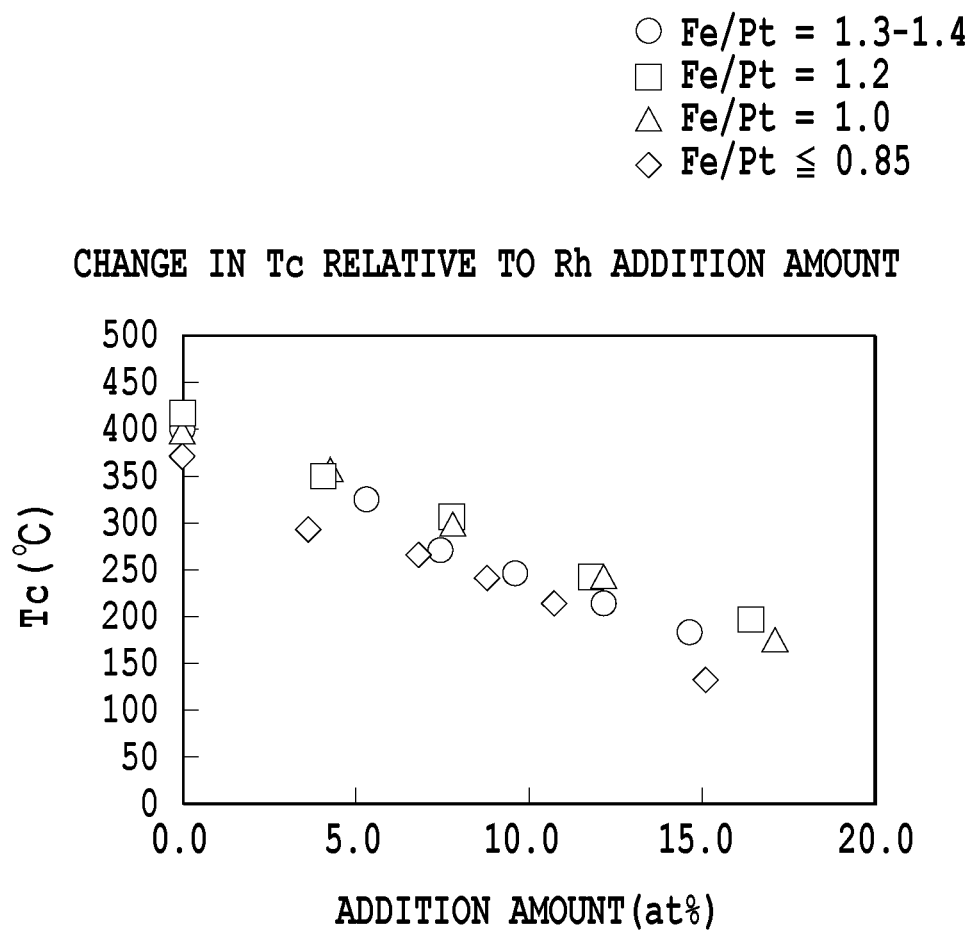
FIG. 6A is a graph showing change in Tc in a case where FePtRh is used for a magnetic recording layer in a magnetic recording medium, the graph showing change in Tc (° C.) relative to an addition amount (at %) of Rh.
Figure 6B:
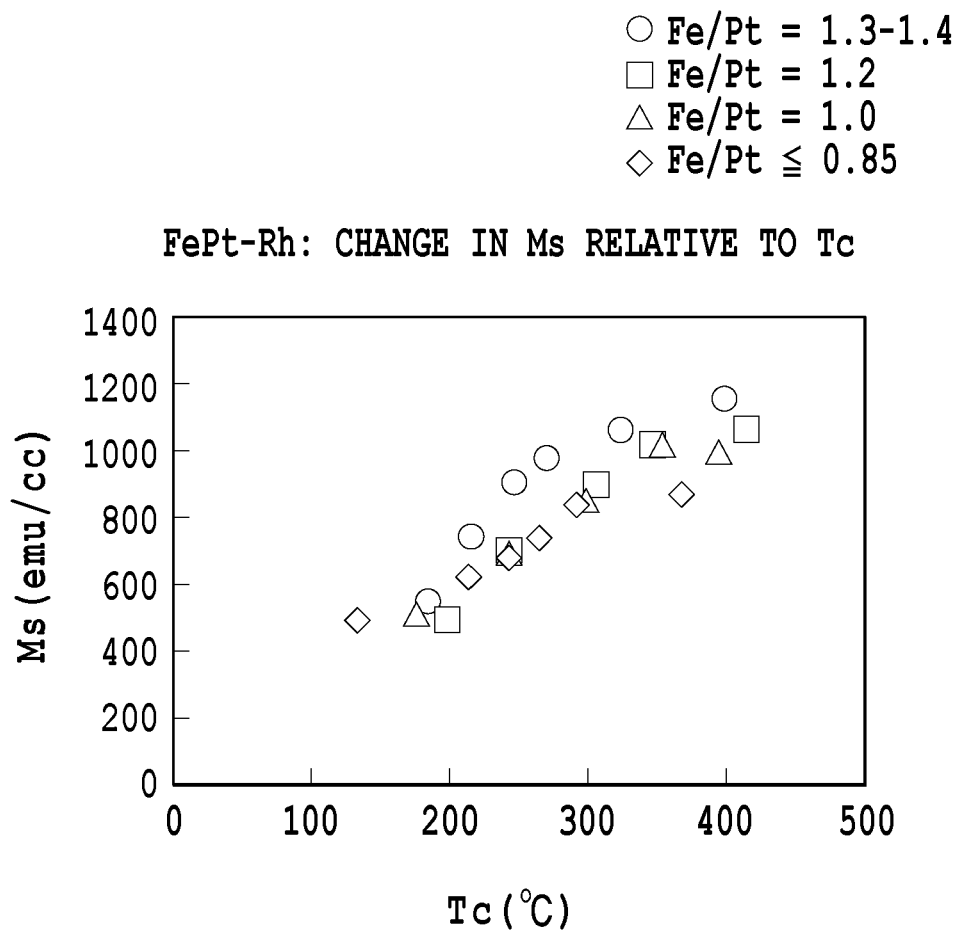
FIG. 6B is a graph showing change in saturation magnetization (Ms) in a case where FePtRh is used for a magnetic recording layer of a magnetic recording medium, the graph showing change in Ms (emu/cc) relative to Tc (° C.)
Figure 6C:
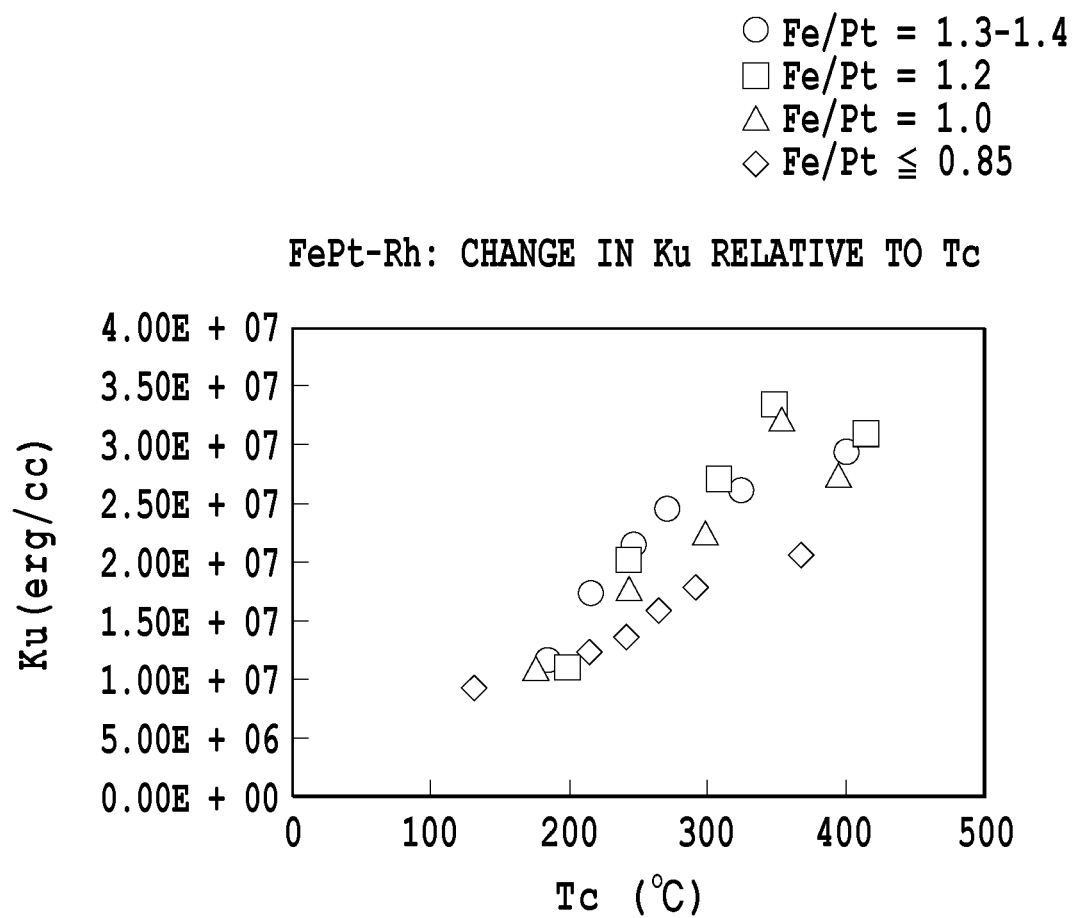
FIG. 6C is a graph showing change in a magnetic anisotropy constant (Ku) in a case where FePtRh is used for a magnetic recording layer of a magnetic recording medium, the graph showing change in Ku (erg/cc) relative to change in Tc.
Figure 7:
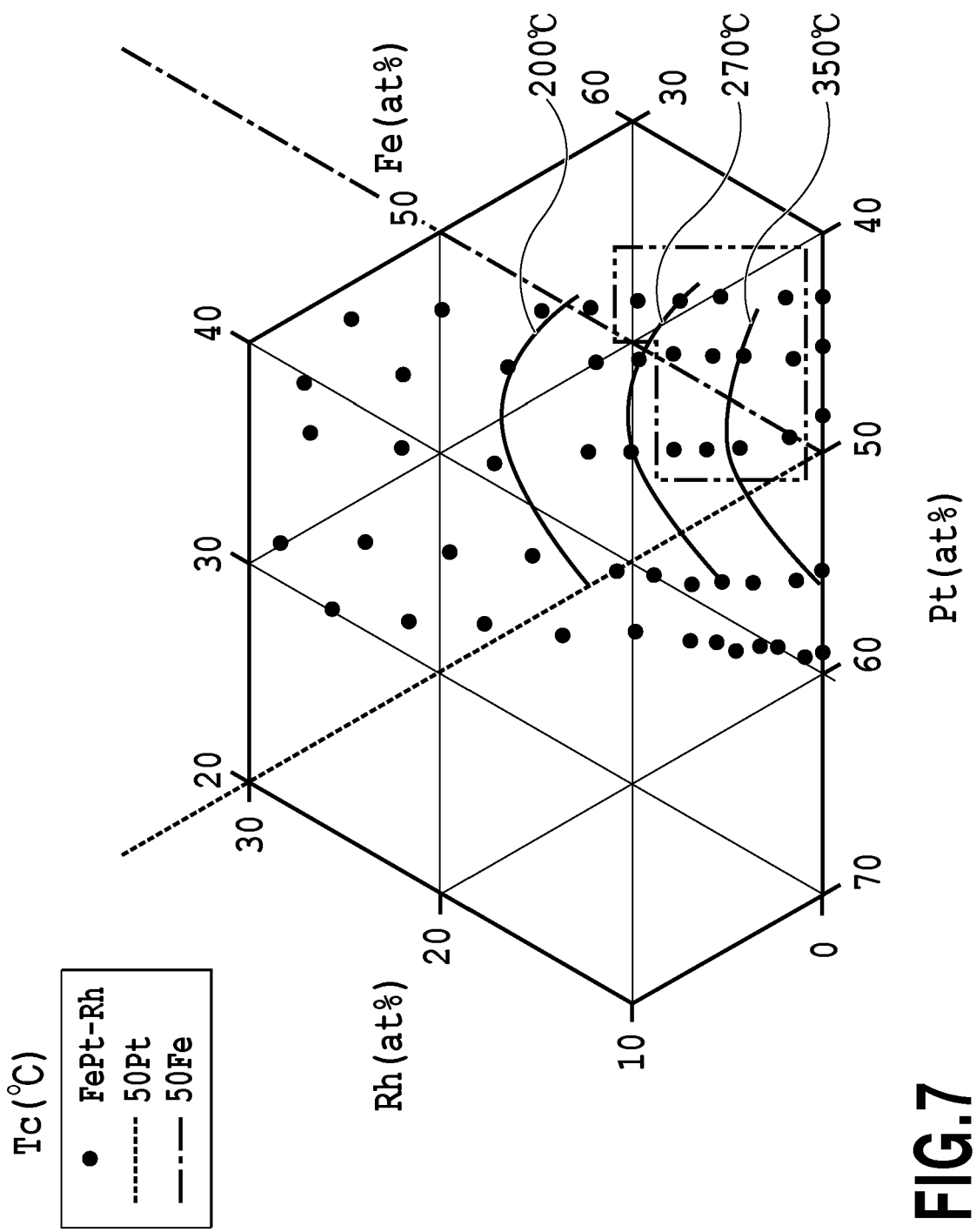
FIG. 7 is a ternary phase diagram plotting Tc relative to contents (at %) of Fe, Pt and Rh in a case where FePtRh is used for a magnetic recording layer of a magnetic recording medium.
Figure 8:
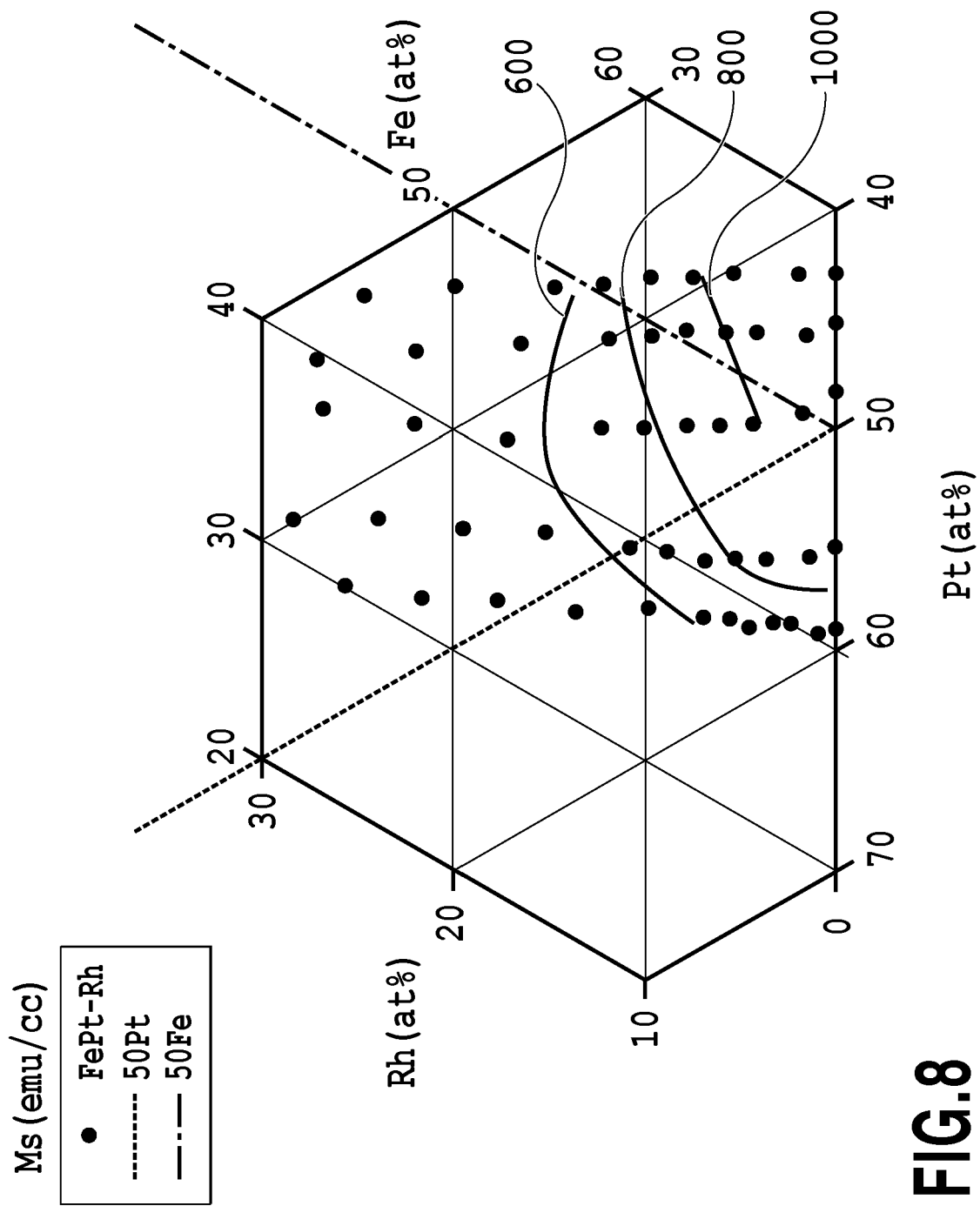
FIG. 8 is a ternary phase diagram plotting Ms relative to contents (at %) of Fe, Pt and Rh in a case where FePtRh is used for a magnetic recording layer of a magnetic recording medium.
Figure 9:
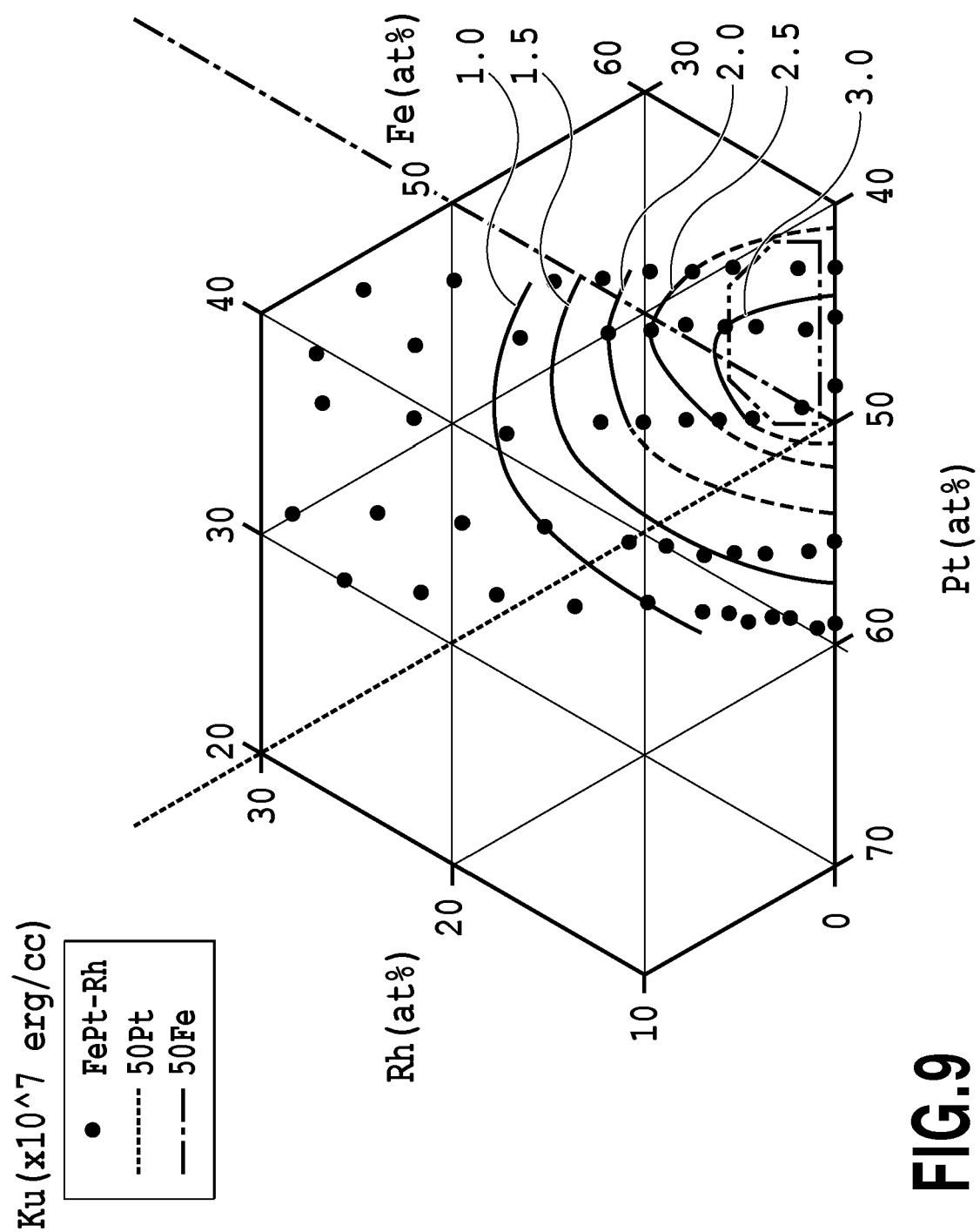
FIG. 9 is a ternary phase diagram plotting Ku relative to contents (at %) of Fe, Pt and Rh in a case where FePtRh is used for a magnetic recording layer of a magnetic recording medium.

Above-described results of properties are shown in FIGS. 6A to 10C. In FIGS. 6A to 6C, measurement results of Tc, Ms and Ku corresponding to Fe/Pt ratios are shown. FIGS. 7 to 9, respectively, are ternary phase diagrams in which Tc, Ms and Ku are plotted with respect to contents (at %) of Fe, Pt and Rh, when FePtRh is used for a magnetic recording layer of a magnetic recording medium.

Evaluation of Results in Example 2

As shown in FIG. 6A, in a magnetic recording layer consisting of FePtRh, Tc lowered as the addition amount of Rh increased. In addition, as shown in FIGS. 6B and 6C, Ms and Ku lowered along with the lowering of Tc, but it is considered that sufficient magnetic properties can be realized at Tc of approximately 250 to 300° C., at which the lowering of Tc is considered to be sufficient. Therefore, it is considered that a Rh addition amount of 10 at % or less (based on the total amount of FePtRh) that can realize the Tc is a preferable Rh addition amount. Furthermore, referring to the Fe/Pt ratio that, if an Fe/Pt ratio is 1.0 or more as shown in FIG. 6C, an excellent Ku value is considered to be capable of being realized in a Rh addition amount of 10 at % or less (Tc is about 250° C. or higher). Moreover, referring to Fe and Pt contents that, in a region in which an Fe/Pt ratio exceeds 1.0 (Fe/Pt=1.2-1.4), particularly excellent properties can be realized in an Fe content of 50% or more.

Also from ternary phase diagrams in FIGS. 7 to 9, it is found that excellent Tc, Ms and Ku can be realized when the addition amount of Rh is 10 at % or less, similarly to the results in FIGS. 6A to 6C.

Examples 3 to 5

In the Examples, Tc, Ms and Ku of FePtX (X=Cu, Mn or Ru) were evaluated.

Respective layers of a magnetic recording medium were deposited respectively according to a procedure below, and magnetic properties were evaluated.

A magnesium oxide (MgO) substrate was prepared. The substrate was introduced into a sputtering apparatus with an inline system. A Pt layer having a thickness of 20 nm was formed by an RF sputtering method using a pure Pt target in Ar gas having a pressure of 0.44 Pa. Substrate temperature at the time of forming the Pt layer was 350° C. A puttering electric power at the time of forming the Pt layer was 300 W.

Next, on the substrate having the Pt layer formed thereon, an FePtX layer consisting of FePtX was formed by an RF sputtering method using an FePt target and an addition element (X: X=Cu, Mn and Ru) in Ar gas having a pressure of 0.60 Pa, at 350° C. Thickness of the FePtX layer was 10 nm. Electric powers applied to targets at the time of forming the FePtX layer were 300 W (FePt) and 0 to 240 W (X). The content of X in the layer consisting of FePtX was adjusted to an intended value by changing the electric power to be applied to X. Contents of respective elements are shown in Tables 4 to 6. Note that an excerpt of measurement results of FePtRh shown, as a reference, in the Table 2 is shown together as Table 7.

TABLE 4

Example 3 Composition and properties of (FePtCu)

FePtCu composition

| Fe content (at %) | Pt content (at %) | Cu addition amount (at %) | Fe/Pt | Ms (emu/cm$^3$) | Ku [PPMS-TRQ] (erg/cm$^3$) | Tc (° C.) |
|---|---|---|---|---|---|---|
| 54.2 | 45.8 | 0.0 | 1.2 | 1068 | 3.12E+07 | 418 |
| 49.1 | 41.4 | 9.5 | 1.2 | 949 | 2.05E+07 | 375 |
| 46.0 | 38.7 | 15.3 | 1.2 | 853 | 1.40E+07 | 342 |
| 45.9 | 54.1 | 0.0 | 0.85 | 875 | 2.07E+07 | 371 |
| 38.3 | 54.7 | 7.0 | 0.70 | 705 | 1.04E+07 | 291 |
| 35.4 | 49.2 | 15.4 | 0.72 | 597 | 8.03E+06 | 247 |

TABLE 5

Example 4 Composition and properties of (FePtMn)

FePtMn composition

| Fe content (at %) | Pt content (at %) | Mn addition amount (at %) | Fe/Pt | Ms (emu/cm$^3$) | Ku [PPMS-TRQ] (erg/cm$^3$) | Tc (° C.) |
|---|---|---|---|---|---|---|
| 54.2 | 45.8 | 0.0 | 1.2 | 1068 | 3.12E+07 | 418 |
| 53.0 | 42.6 | 4.4 | 1.2 | 930 | 2.33E+07 | 395 |
| 44.7 | 37.1 | 18.3 | 1.2 | 544 | 2.97E+06 | 301 |
| 45.9 | 54.1 | 0.0 | 0.85 | 875 | 2.07E+07 | 371 |
| 38.1 | 53.3 | 8.6 | 0.72 | 637 | 9.68E+06 | 306 |
| 35.3 | 49.2 | 15.5 | 0.72 | 453 | 5.43E+06 | 291 |

TABLE 6

Example 5 Composition and properties of (FePtRu)

FePtRu composition

| Fe content (at %) | Pt content (at %) | Ru addition amount (at %) | Fe/Pt | Ms (emu/cm$^3$) | Ku [PPMS-TRQ] (erg/cm$^3$) | Tc (° C.) |
|---|---|---|---|---|---|---|
| 54.2 | 45.8 | 0.0 | 1.2 | 1068 | 3.12E+07 | 418 |
| 48.5 | 42.9 | 8.6 | 1.1 | 673 | 2.05E+07 | 382 |
| 45.6 | 39.5 | 14.9 | 1.2 | 499 | 1.36E+07 | 315 |
| 45.9 | 54.1 | 0.0 | 0.85 | 875 | 2.07E+07 | 371 |
| 42.8 | 50.9 | 6.3 | 0.84 | 641 | 1.19E+07 | 310 |
| 40.0 | 48.2 | 11.9 | 0.83 | 453 | 8.91E+06 | 199 |

TABLE 7

Example 2 Composition (selection) and properties of (FePtRh)

FePtRh composition

| Fe content (at %) | Pt content (at %) | Rh addition amount (at %) | Fe/Pt | Ms (emu/cm$^3$) | Ku [PPMS-TRQ] (erg/cm$^3$) | Tc (° C.) |
|---|---|---|---|---|---|---|
| 54.2 | 45.8 | 0.0 | 1.2 | 1068 | 3.12E+07 | 418 |
| 50.6 | 41.6 | 7.8 | 1.2 | 904 | 2.73E+07 | 309 |
| 48.2 | 40.0 | 11.8 | 1.2 | 708 | 2.03E+07 | 245 |
| 45.9 | 54.1 | 0.0 | 0.85 | 875 | 2.07E+07 | 371 |
| 40.7 | 52.5 | 6.8 | 0.78 | 741 | 1.61E+07 | 267 |
| 37.8 | 47.1 | 15.1 | 0.80 | 494 | 9.26E+06 | 134 |

Results in Examples 3 to 5 and an excerpt of the result in Example 2 are shown as graphs in FIGS. 10A to 11C. (Evaluation of results in Example 2 and Examples 3 to 5)

Figure 10A:
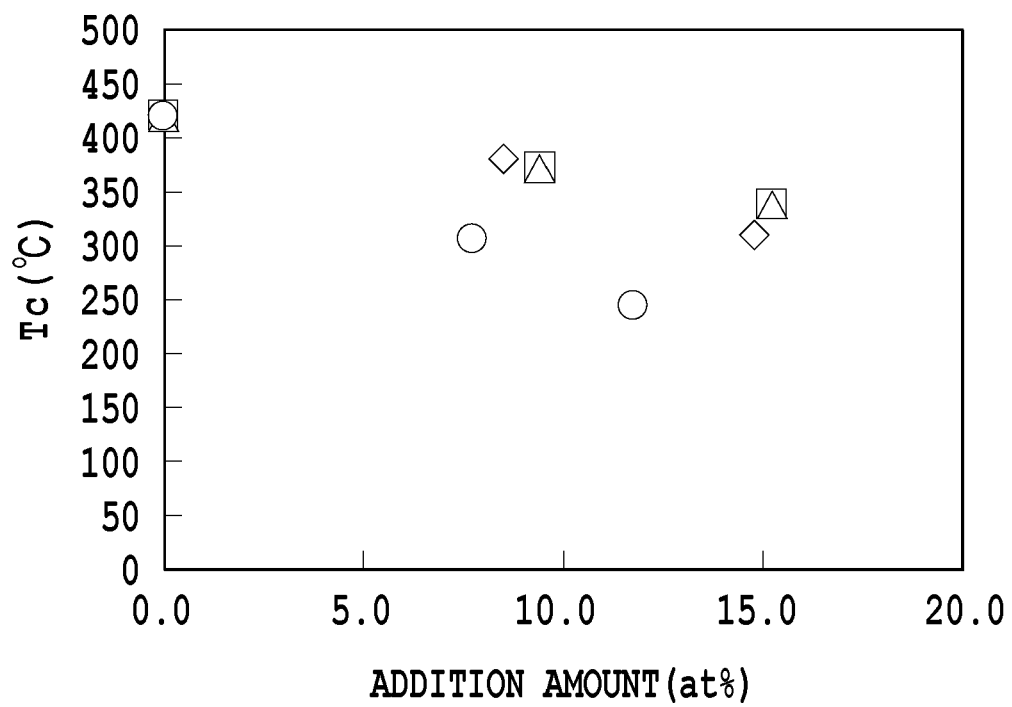
FIG. 10A is a graph showing change in Tc in a case where FePtX (X=Rh, Cu, Mn or Ru) is used for a magnetic recording layer of a magnetic recording medium and Fe/Pt=1.2 (however, in a case where X=Ru, Fe/Pt=1.1 and 1.2), the graph showing change in Tc (° C.) relative to an addition amount (at %) of X.
Figure 10B:
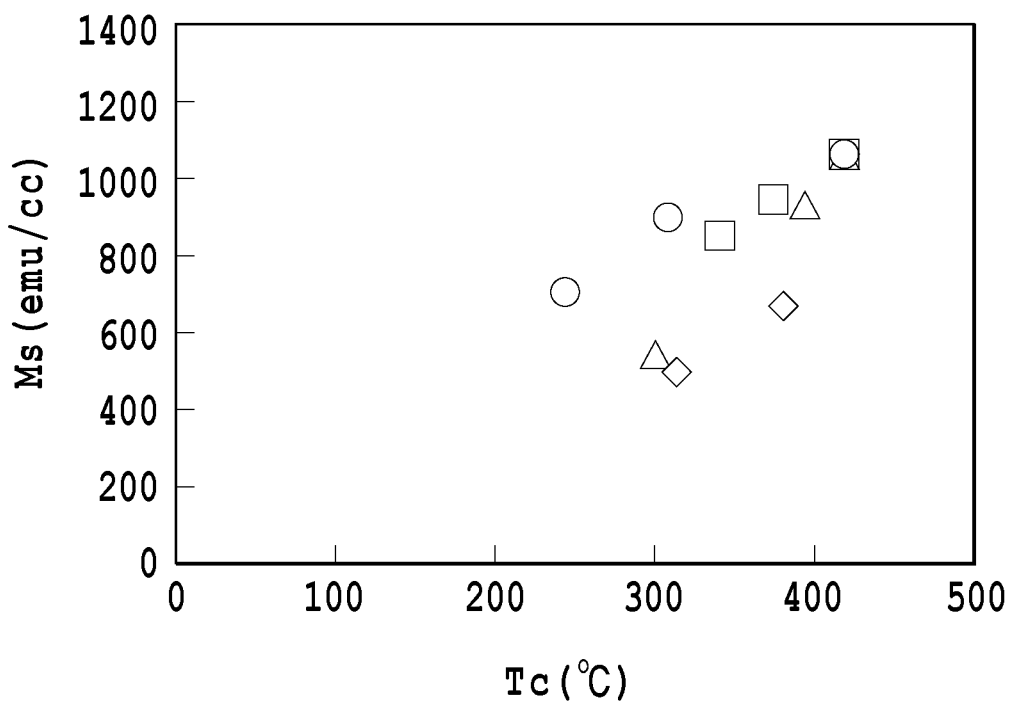
FIG. 10B is a graph showing change in Ms in a case where FePtX (X=Rh, Cu, Mn or Ru) is used for a magnetic recording layer of a magnetic recording medium and Fe/Pt=1.2 (proviso that when X=Ru, Fe/Pt=1.1 and 1.2), the graph showing change in Ms (emu/cc) relative to Tc (° C.)
Figure 10C:
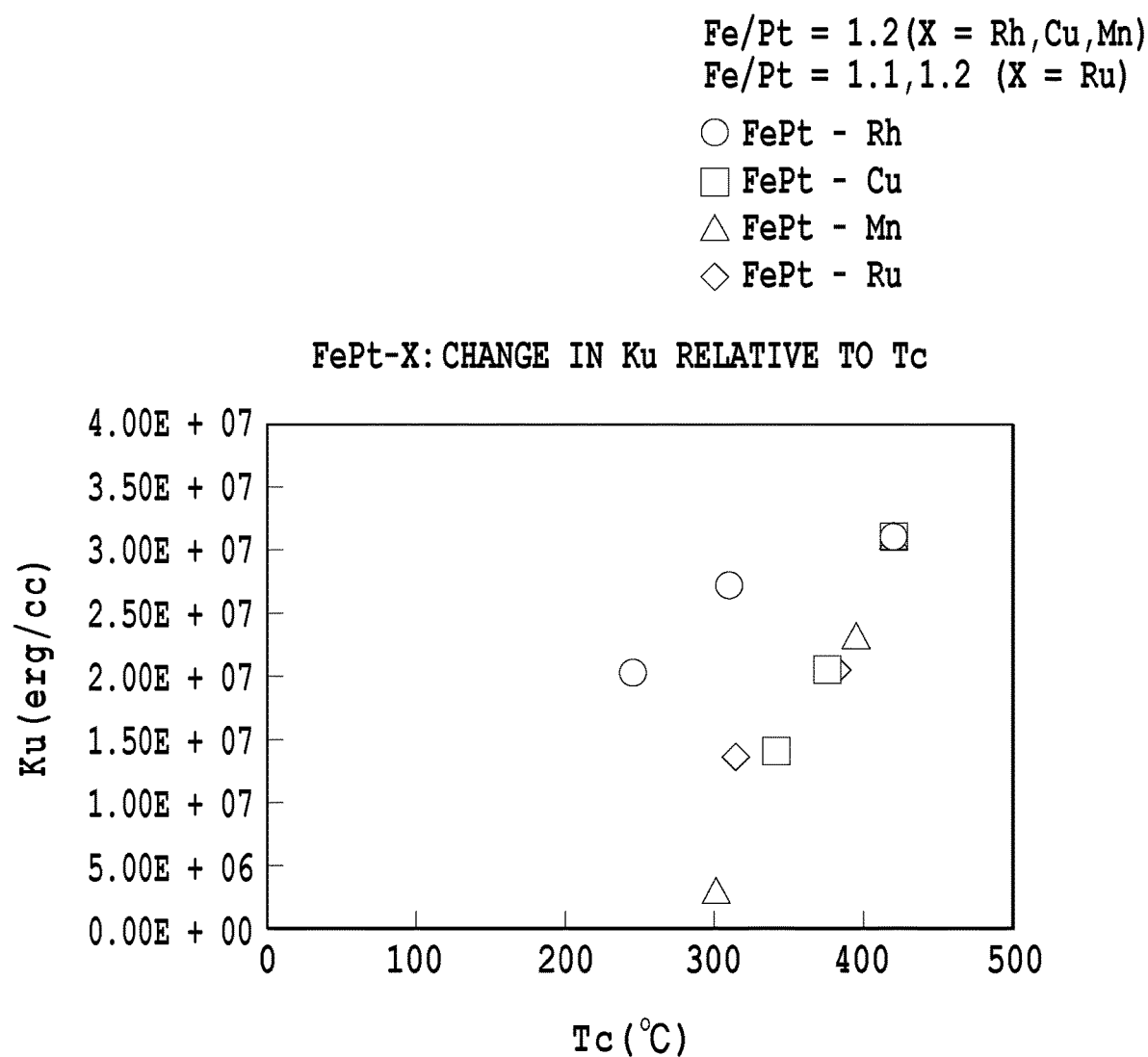
FIG. 10C is a graph showing change in Ku in a case where FePtX (X=Rh, Cu, Mn or Ru) is used for a magnetic recording layer of a magnetic recording medium and Fe/Pt=1.2 (proviso that when X=Ru, Fe/Pt=1.1 and 1.2), the graph showing change in Ku (erg/cc) relative to change in Tc.

Referring to the cases of Fe/Pt=1.2 shown in FIGS. 10A to 10C, large lowering of Tc was exhibited in a case where X was Rh, as compared with a case where X was Ru, Mn or Cu in FePtX (FIG. 10A). Furthermore, in a case where X was Rh, values of Ms and Ku also exhibited large values as compared with case where X was Ru, Mn or Cu (FIGS. 10B and 10C).

Figure 11A:
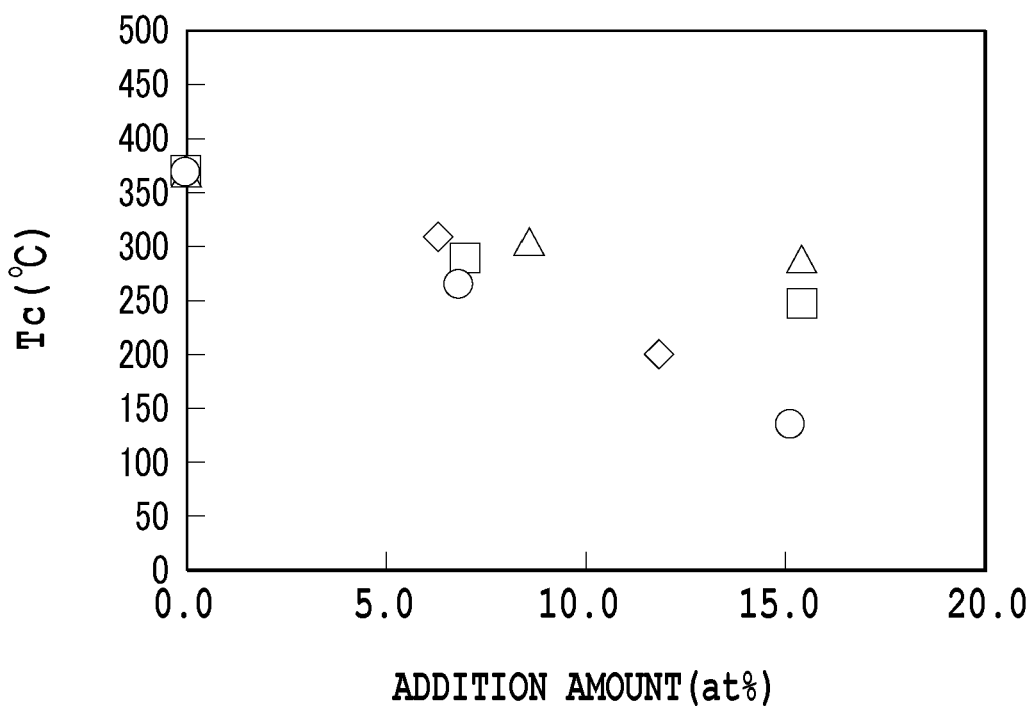
FIG. 11A is a graph showing change in Tc in a case where FePtX (X=Rh, Cu, Mn or Ru) is used for a magnetic recording layer of a magnetic recording medium and Fe/Pt≤0.85, the graph showing change in Tc (° C.) relative to an addition amount (at %) of X.
Figure 11B:
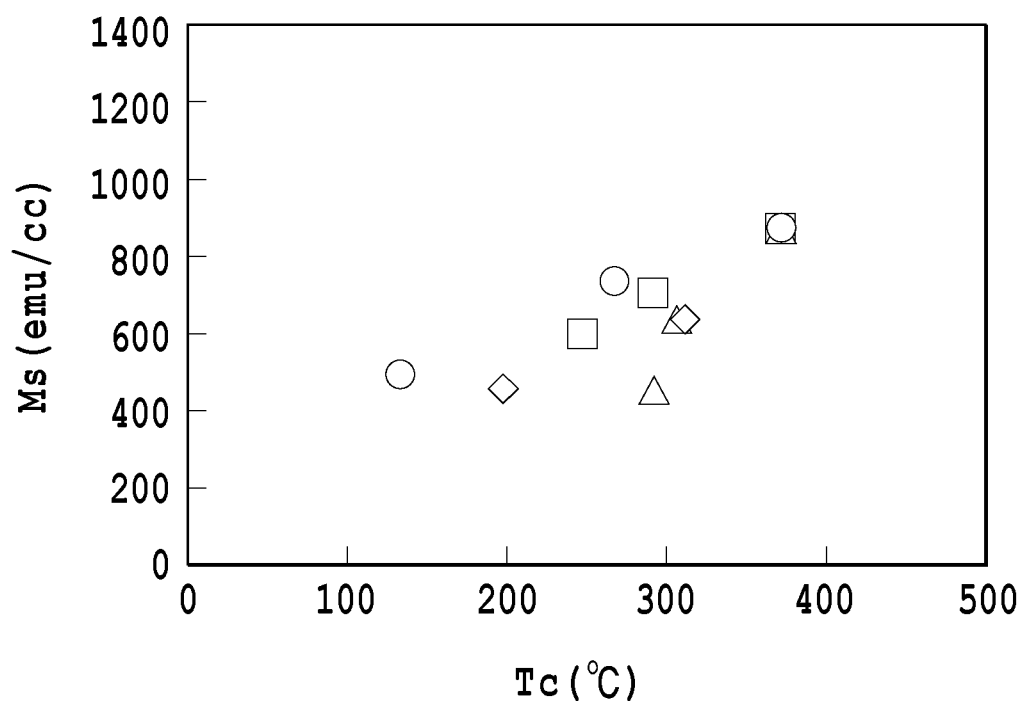
FIG. 11B is a graph showing change in Ms in a case where FePtX (X=Rh, Cu, Mn or Ru) is used for a magnetic recording layer of a magnetic recording medium and Fe/Pt≤0.85, the graph showing change in Ms (emu/cc) relative to Tc (° C.)
Figure 11C:
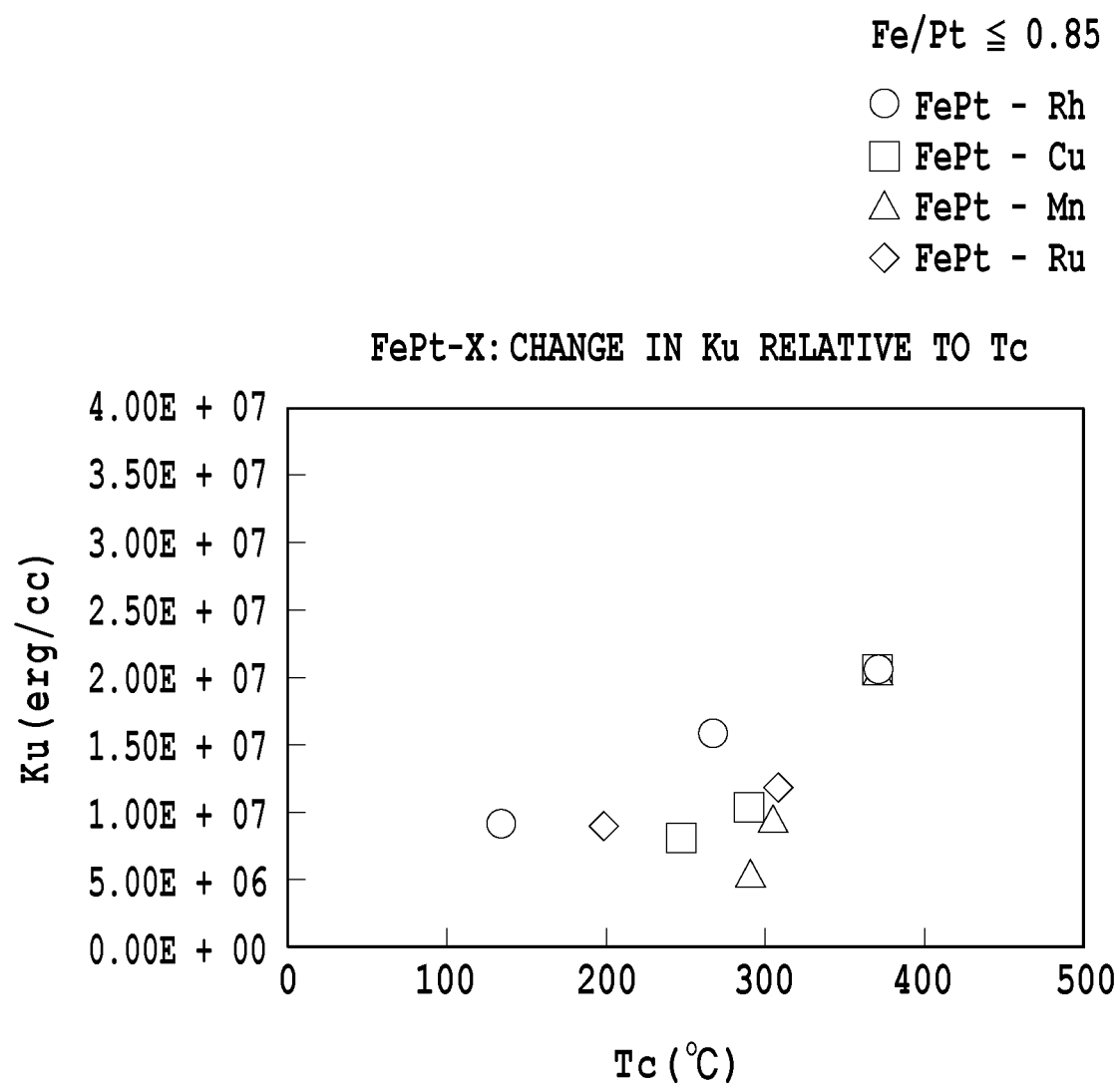
FIG. 11C is a graph showing change in Ku in a case where FePtX (X=Rh, Cu, Mn or Ru) is used for a magnetic recording layer of a magnetic recording medium and Fe/Pt≤0.85, the graph showing change in Ku (erg/cc) relative to change in Tc.

Next, Fe/Pt≤0.85 shown in FIGS. 11A to 11C showed that lowering of Tc was exhibited in a case where X was Rh in FePtX as compared with a case where X was Mn or Cu, but lowering of Tc was approximately the same level as compared with a case where X was Ru (FIG. 11A). Furthermore, a comparison between values of Ms and Ku showed that Ms exhibited a large value but a Ku value was a value not being sufficient, in a case where X was Rh as compared with a case where X was Ru, Mn or Cu (FIGS. 11B and 11C).

From results in Table 2 and FIGS. 6A to 9 described in the evaluation in Example 2, and results in FIGS. 10A to 11C, it was found that FePtRh was excellent as a material for a magnetic recording layer. In particular, in the addition amount of Rh of 10 at % or less, a variant amount is lowered and an in-plane orientation component is lowered. Furthermore, when the addition amount of Rh was 10 at % or less, excellent properties of Tc, Ms and Ku were able to be realized even when the FePtRh was compared with FePtX in which X was Ru, Mn or Cu. Moreover, in the FePtRh ordered alloy, the Fe/Pt ratio is preferably about 0.9 or more, more preferably 1.0 or more, and further preferably 1.2 or more.

From the above results, FePtRh is excellent as a material of a magnetic recording layer, has excellent magnetic properties, does not increase in-plane orientation, and can lower Tc, in a predetermined composition range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their entirety.

The invention claimed is:

1. A magnetic recording medium comprising a substrate and a magnetic recording layer, said magnetic recording layer comprising an ordered alloy having Fe, Pt and Rh, wherein said ordered alloy having Fe, Pt and Rh has an Fe/Pt ratio of 1.0 or more, and a Rh content in said ordered alloy having Fe, Pt and Rh is 1.5 at % or more to 10 at % or less, and an Fe content is 50.5 at % or more.

2. The magnetic recording medium according to claim 1, wherein said ordered alloy having Fe, Pt and Rh has an Fe/Pt ratio of 1.2 or more.

3. The magnetic recording medium according to claim 2, wherein said magnetic recording layer has a variant amount of 90% or less, the variant amount being a ratio of peak integrated intensities between (002) representing a perpendicular orientation component of FePt and (200) representing an in-plane orientation component, evaluated by use of XRD.

4. The magnetic recording medium according to claim 2, wherein said ordered alloy having Fe, Pt and Rh has an Fe/Pt ratio of 1.2 or more and 1.4 or less.

5. The magnetic recording medium according to claim 4, wherein said magnetic recording layer has a variant amount of 90% or less, the variant amount being a ratio of peak integrated intensities between (002) representing a perpendicular orientation component of FePt and (200) representing an in-plane orientation component, evaluated by use of XRD.

* * * * *